(12) United States Patent
Khodadad et al.

(10) Patent No.: US 9,239,479 B2
(45) Date of Patent: Jan. 19, 2016

(54) CALIBRATION OF TUNABLE LIQUID CRYSTAL OPTICAL DEVICE

(75) Inventors: Behzad Khodadad, Los Altos, CA (US); Michael J. Nystrom, San Jose, CA (US); Bahram Afshari, Los Altos, CA (US); Karen Asatryan, Quebec (CA); Tigran Galstian, Quebec (CA)

(73) Assignee: LENSVECTOR INC., Sunnyvale, CA (US)

( * ) Notice: Subject to any disclaimer, the term of this patent is extended or adjusted under 35 U.S.C. 154(b) by 153 days.

(21) Appl. No.: 13/822,898

(22) PCT Filed: Sep. 21, 2011

(86) PCT No.: PCT/CA2011/050583
§ 371 (c)(1),
(2), (4) Date: May 24, 2013

(87) PCT Pub. No.: WO2012/037684
PCT Pub. Date: Mar. 29, 2012

(65) Prior Publication Data
US 2013/0250197 A1 Sep. 26, 2013

Related U.S. Application Data

(60) Provisional application No. 61/384,962, filed on Sep. 21, 2010.

(51) Int. Cl.
G02F 1/133 (2006.01)
(52) U.S. Cl.
CPC ........ G02F 1/13306 (2013.01); *G02F 2203/60* (2013.01)
(58) Field of Classification Search
CPC .......... G02F 1/13306; G02F 1/133382; G02F 2203/60
See application file for complete search history.

(56) References Cited

U.S. PATENT DOCUMENTS 4,922,182 A 5/1990 Cox
6,727,468 B1 * 4/2004 Nemeth ......................... 219/209
(Continued)

FOREIGN PATENT DOCUMENTS

WO WO 2009/146530 A1 12/2009
WO WO 2009/153764 A2 12/2009

OTHER PUBLICATIONS

A.F.Naumov et al., Control optimization of spherical modal liquid crystal lenses, Optics Express, pp. 344-352, Apr. 26, 1999, vol. 4, No. 9.
A.F.Naumov et al., Liquid-Crystal Adaptive Lenses with Modal Control, Optics Letters, pp. 992-994, Jul. 1, 1998, vol. 23, No. 13, Optical Society of America.
(Continued)

*Primary Examiner* — Michael Caley
(74) *Attorney, Agent, or Firm* — J-TEK Law PLLC; Jeffrey D. Tekanic; Scott T. Wakeman

(57) ABSTRACT

A tunable liquid crystal optical device is described. The optical device has an electrode arrangement associated with a liquid crystal cell and includes a hole patterned electrode, wherein control of the liquid crystal cell depends on electrical characteristics of liquid crystal optical device layers. The optical device further has a circuit for measuring said electrical characteristics of the liquid crystal optical device layers, and a drive signal circuit having at least one parameter adjusted as a function of the measured electrical characteristics. The drive signal circuit generates a control signal for the electrode arrangement.

28 Claims, 23 Drawing Sheets

(56) References Cited

U.S. PATENT DOCUMENTS

| | | |
|---|---|---|
| 2009/0166426 A1 | 7/2009 | Giebel et al. |
| 2011/0090415 A1 | 4/2011 | Asatryan et al. |
| 2011/0109824 A1 | 5/2011 | Galstian |
| 2011/0216257 A1 | 9/2011 | Galstian et al. |
| 2012/0019761 A1 | 1/2012 | Nystrom et al. |

OTHER PUBLICATIONS

PCT/CA2011/050583 International search report.
PCT/CA2011/050783 International search report.
PCT/CA2011/050583 Written Opinion.

* cited by examiner

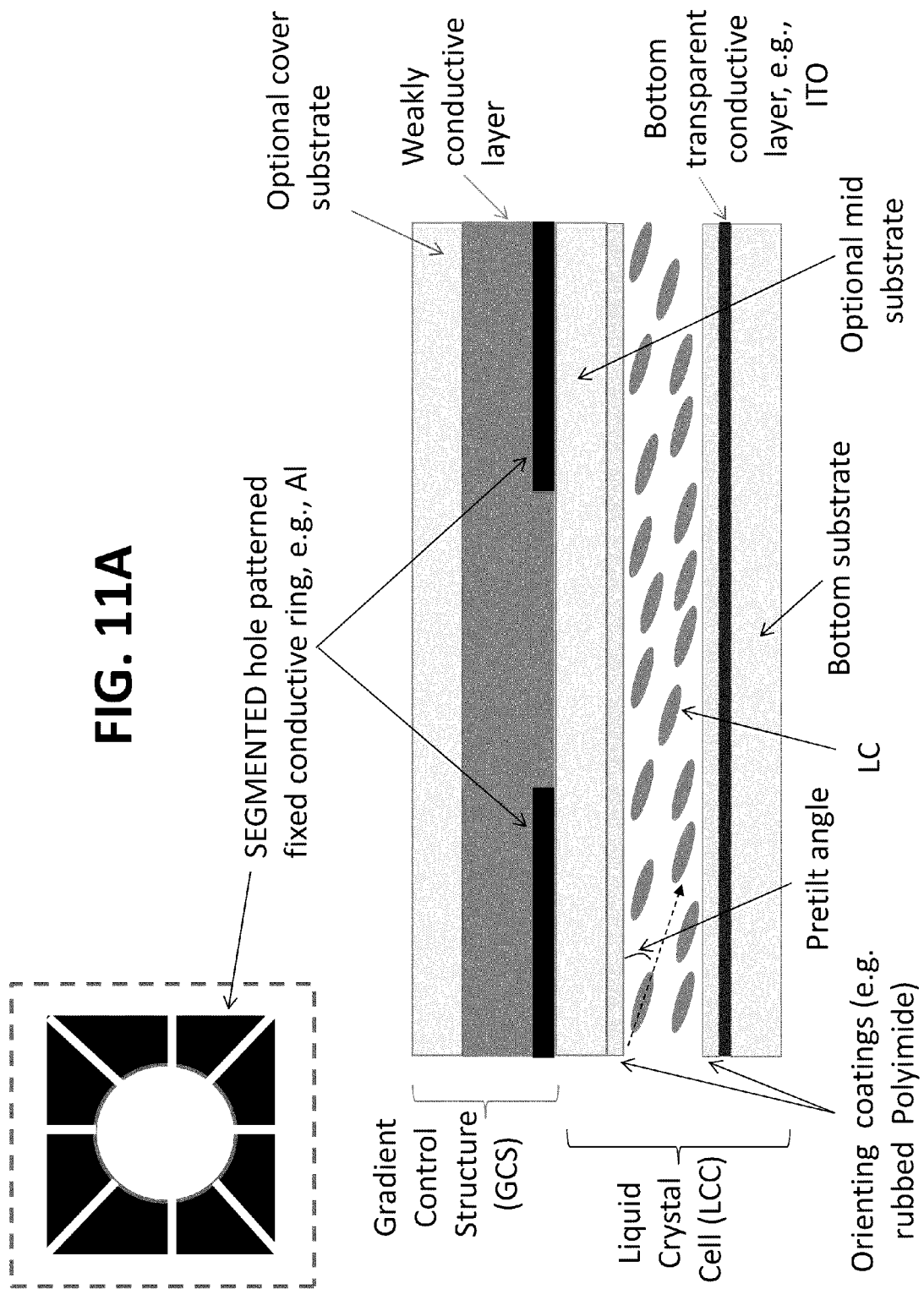

CALIBRATION OF TUNABLE LIQUID CRYSTAL OPTICAL DEVICE

CROSS-REFERENCE

This application is the U.S. national stage of International Application No. PCT/CA2011/050583 filed on Sep. 21, 2011,which claims priority to U.S. Provisional Patent Application No. 61/384,962 filed on Sep. 21, 2010.

TECHNICAL FIELD

The present invention relates to tunable liquid crystal optical devices.

BACKGROUND

Liquid crystal lenses and other optical devices are known in the art. One known geometry is a planar construction in which liquid crystal is held in a cell between glass or plastic plates. An electrically variable GRadient INdex (so called GRIN) lens can be provided by having a spatial variation of the index of refraction of the liquid crystal material across (within) the aperture of the device. Good optical power of a lens can be achieved without substantive thickness.

A variety of liquid crystal lens designs have been proposed affecting, with spatial variation, the way in which the liquid crystal is oriented in response to an electric field. U.S. Pat. No. 7,667,818 to Galstian et al. and U.S. Pat. No. 6,864,951 to Ren et al., which are incorporated herein by reference, disclose different techniques for spatially influencing how a uniform electric field orients liquid crystal (molecules) in a layer. Commonly-assigned PCT patent application publication WO/2010/006420 published Jan. 21, 2010, which is incorporated herein by reference, teaches a spatial modulation of an alignment layer on a liquid crystal cell wall to form a zero voltage lens that can be reduced or erased by applying a spatially uniform electric field.

Most designs, however, spatially modulate an electric field acting on the liquid crystal layer to create a resulting GRIN lens. In this area, a few approaches have been taken. Using relatively large voltages, it has been shown that a ring electrode placed at a distance above a liquid crystal cell under which a planar electrode is arranged, can provide a GRIN lens. In an article published by A. F. Naumov et al., titled "Liquid-Crystal Adaptive Lenses with Modal Control" OPTICS LETTERS, Vol. 23, No. 13, Jul. 1, 1998, edge (ring) electrodes are arranged with an electrically resistive coating of titanium oxide placed on a glass substrate with the liquid crystal alignment layer placed on the electrode coating, essentially as shown in FIG. 1A. The GRIN lens taught by Naumov et al. has a liquid crystal cell with a distributed reactive electrical impedance. The conductance and the capacitance of the liquid crystal between the electrodes play an important role in the distributed reactive electrical impedance. The resistance of the titanium oxide coating is between 2 and 10 MΩ/□. Lens focal length is essentially controlled by voltage at higher optical powers, while at lower optical power, it is reported that both frequency and voltage can be used to control optical power. That is lens control is very complex.

Optical and electrical performance of the Naumov et al. lens design are good, however, a significant drawback is that the resistive coating is difficult to manufacture to have reproducible (part-to-part) and uniform properties. FIG. 1B illustrates resistive characteristics of the resistive coating. The resistance bulk material property becomes relevant as a sheet resistance of the resistive coating. The sheet resistance undergoes high variability at coating thicknesses which enable the operation of such liquid crystal lenses or optical devices. Optically suitable coating materials have been found to exhibit the required sheet resistance in a percolation zone where minute differences in resistive coating thickness in manufacturing terms, result in very large sheet resistance variability.

Research directed by Susumu Sato has led to a design using a ring electrode on one side of the liquid crystal with a planar electrode on the other side, in addition to a planar electrode on top of the ring electrode. This geometry was also shown to benefit from the use of resistive coating placed between the liquid crystal and the ring shaped electrode, see for example, "Reducing Driving Voltages for Liquid Crystal Lens Using Weakly Conductive Thin Film" by Mao Ye, Bin Wang, Maki Yamaguchi, and Susumu Sato, published in Japanese Journal of Applied Physics, Vol. 47, No. 6, 2008, pp. 4597-4599.

In PCT patent application publication WO2007/098602 published Sep. 7, 2007 to Galstian et al., which is incorporated herein by reference, a liquid crystal lens uses uniform planar electrodes with an electric field modulation layer that is optically hidden, while spatially modulating the electric field due to a non-uniform dielectric constant.

In commonly-assigned PCT patent application publication, WO2009/153764 published Dec. 23, 2009, which is incorporated herein by reference, a ring electrode is placed on one side of a glass substrate with an alignment layer on an opposite side of the glass substrate. A weakly conductive layer is provided on or near the ring electrode to create a charge spatial distribution across (over) the aperture. The optical power of the lens can be controlled from zero to maximum optical power by varying (using) the frequency of the control signal. The present assignee, LensVector Inc., has demonstrated lenses of 15 diopters, 2 mm aperture and a total thickness of about 0.5 mm, with an operating voltage of about 28 V.

In the case of a ring electrode that uses a frequency dependent material, a highly resistive material, or a weakly conductive material (hereinafter called a weakly conductive material) placed near the aperture, the electrical (or sheet) resistance of the material plays an important role in defining the electrode and lensing properties. Controlling the resistance of a thin layer of material on a wafer is a challenge, while the resistance or conductive properties are very important to frequency control of the electrode.

SUMMARY

According to the proposed solution, characteristics of a tunable liquid crystal device are measured so as to select control signal parameters within a range suitable for controlling the liquid crystal cell taking into account the characteristics measured.

According to the proposed solution, electrical properties of a tunable liquid crystal lens are measured so as to select control signal parameters within a range suitable for controlling the liquid crystal cell taking into account the electrical properties measured.

According to the proposed solution, the sheet resistance of a highly resistive or weakly conductive material layer is measured so as to select control signal parameters within a range suitable for controlling the liquid crystal cell taking into account the sheet resistance measured.

BRIEF DESCRIPTION OF THE DRAWINGS

The invention will be better understood by way of the following detailed description of embodiments of the invention with reference to the appended drawings, in which:

FIG. 11A illustrates a side sectional view of a tunable liquid crystal lens with an inset top view of a segmented top electrode according to an embodiment in which a frequency dependent material is above the segmented, hole patterned electrode;

DETAILED DESCRIPTION

The sheet resistance variability of the resistive coatings complicates liquid crystal lens manufacture in a number of ways. As mentioned herein above, sheet resistance variability reduces inter-lens reproducibility from liquid crystal lens to liquid crystal lens in the same manufacturing run as well reduces inter-lens reproducibility from liquid crystal lens die to liquid crystal lens die singulated from the same wafer. Further, a liquid crystal layer acts only on a single polarization of light incident on a liquid crystal lens. Polarization independent liquid crystal lenses employ two liquid crystal layers for natural and/or ambient light applications. This need for employing two liquid crystal cells renders polarization independent liquid crystal lenses vulnerable to intra-lens reproducibility as dual resistive coatings having matched sheet resistances can only be provided through selection.

Figure 2:
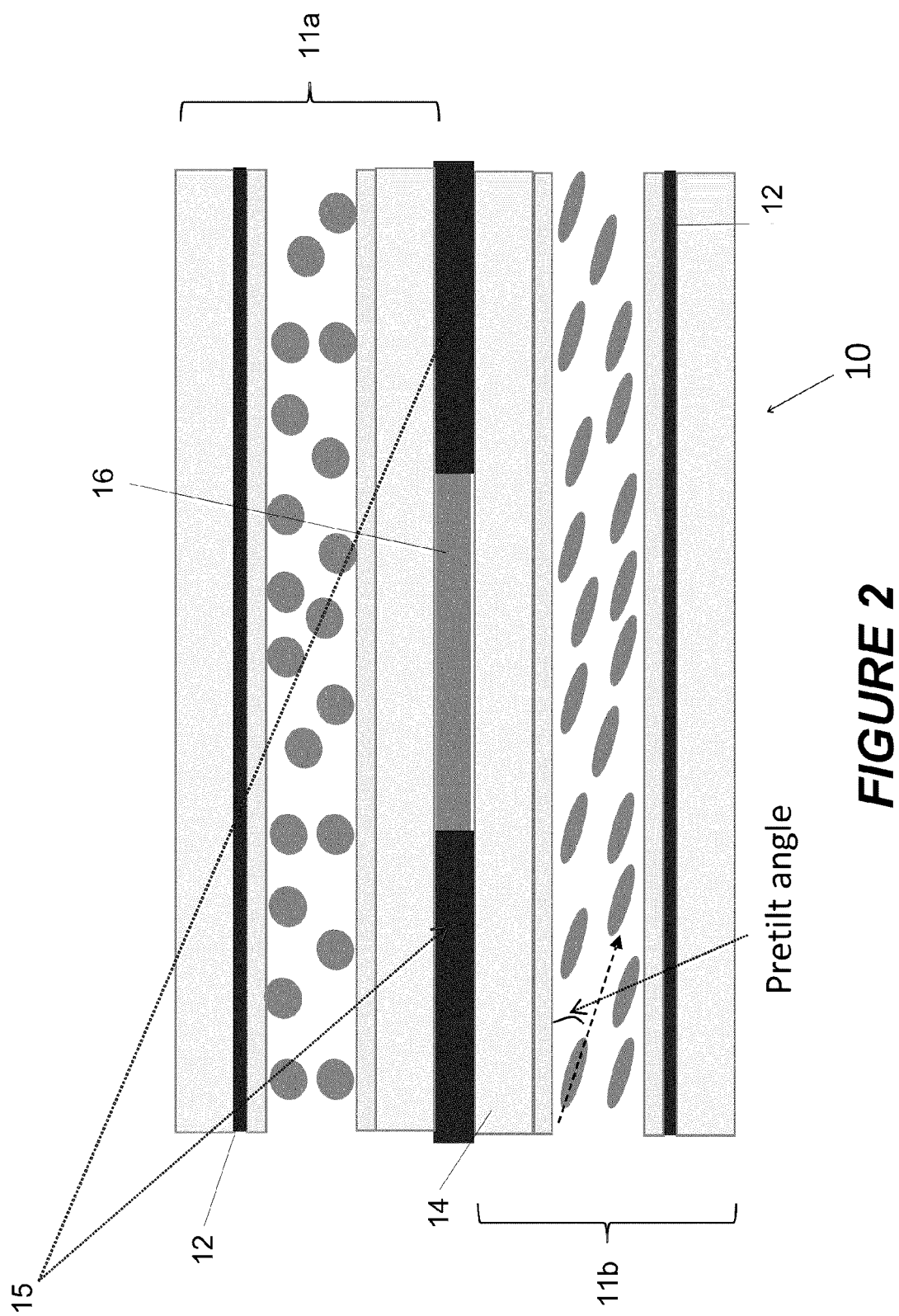
FIG. 2 is a schematic cross-sectional diagram illustrating a tunable liquid crystal lens according to WO2009/153764.

FIG. 2 illustrates one solution providing a polarization independent tunable liquid crystal lens 10 having a common electric field control layer. The arrangement of the two liquid crystal layers, a first liquid crystal cell 11a whose orientation (alignment) layer runs into the page, and a second liquid crystal cell 11b whose orientation (alignment) layer run across the page allows the combination liquid crystal optical device to act on natural light having a mixture of linear polarizations. A pretilt angle is illustrated, and normally can be about, for example, 3 or 4 degrees, for example when an alignment surface (of the liquid crystal layer) is appropriately rubbed. Top and bottom planar indium tin oxide (ITO) electrodes 12 are driven together from a source 10 (shown in FIG. 10), with a middle ring (or hole patterned) electrode 15 providing a spatially modulated electric field that is provided between cells 11a and 11b. A single shared material 16 having weak conductivity (or frequency dependence or high electrical resistivity) is deposited near the ring electrode 15 to occupy the area within or near the ring electrode. The frequency dependent or weakly conductive material can comprise for example a coating of titanium oxide on a surface of the cell walls 14 and acts to influence the operations of both liquid crystal cells substantially equally thus reducing intra-lens reproducibility problems.

For a more extensive (greater) description of the composition and arrangement of the frequency dependent material, reference is made to PCT patent application publication WO2009/153764 published Dec. 23, 2009, which is incorporated herein by reference. In that document, frequency control of a liquid crystal lens is also described, and in some embodiments, a single control signal frequency without voltage control is used to change the optical power of a liquid crystal lens. The frequency to optical power transfer function is dependent on the conductivity properties of the frequency dependent material.

Figure 3:
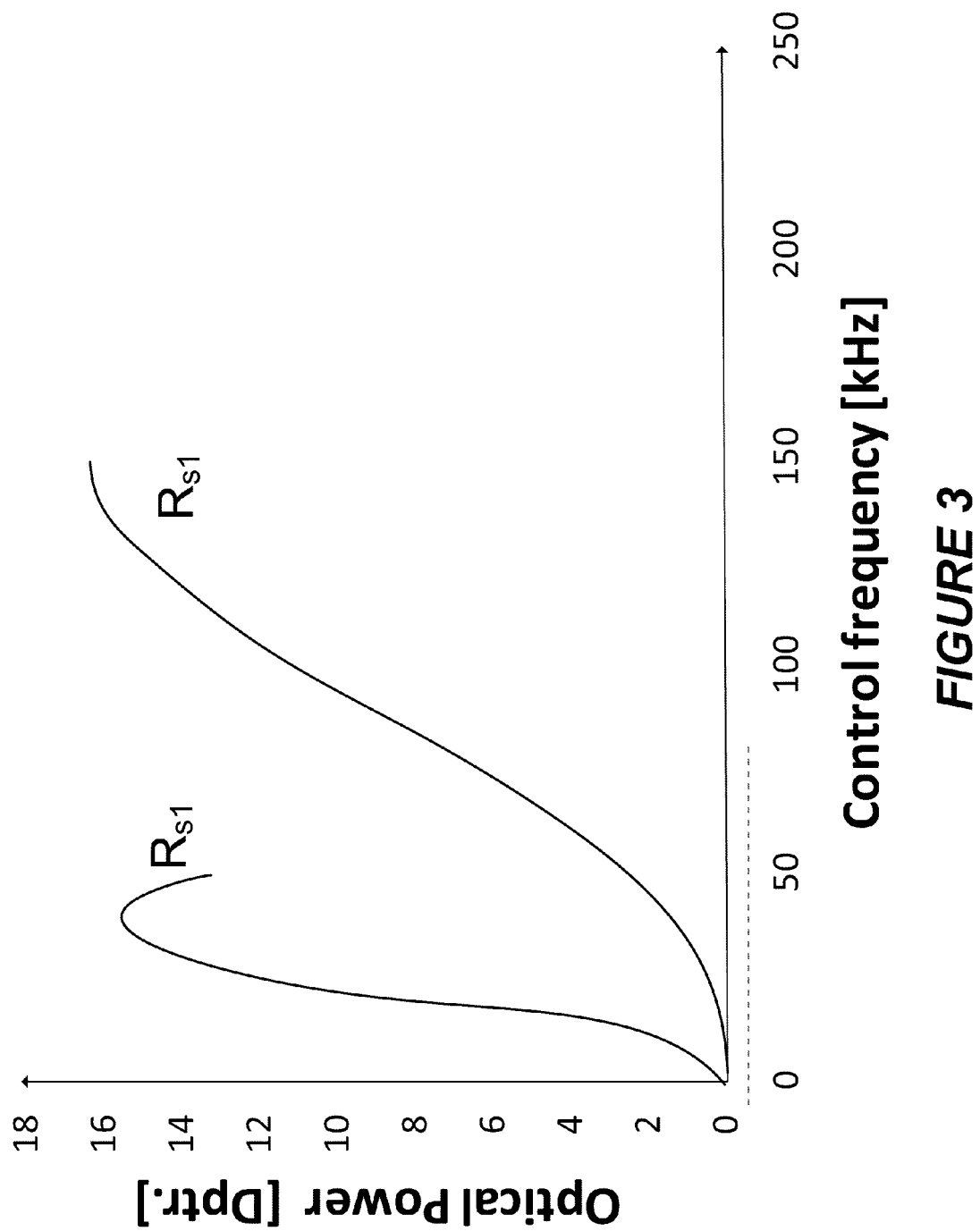
FIG. 3 is a schematic plot illustrating optical power variability as a function of control signal frequency for different lenses which illustrates how sheet resistance influences a frequency-optical power transfer function.

When this material, as for example material 16 in FIG. 2, is deposited in a thin layer, it is difficult to provide a consistent intra-lens sheet resistance. Depending on the deposition technique, the variation in sheet resistance can be significant from sheet to sheet and/or from cell to cell within the same sheet. Typical variation of sheet resistance using best known techniques for depositing a layer is ±10%. Since the transfer function (optical power versus frequency) depends on sheet resistance, the frequency to optical power transfer function can appear as illustrated in FIG. 3 for different lenses with different sheet resistances Rs of the layer 16. This variation in sheet resistance is illustrated at a common temperature, since the sheet resistance may vary with temperature as well.

In accordance with the proposed solution, in the embodiments described hereinbelow, the sheet resistance is measured within each liquid crystal cell and continually during the operation of the liquid crystal cell. In accordance with the proposed solution, sheet resistance can thus be characterized "at the factory" (during or post wafer manufacture) or irregularly during the operation of the optical device so as to adjust calibration parameters of the transfer function. This can be done by measuring the sheet resistance for a single cell or by measuring sheet resistance for a wafer when the cell-to-cell variation is within tolerances. It will be appreciated that when sheet resistance varies with temperature, either the cell must be operated only at the temperature for which the transfer function is calibrated, or the transfer function must be calibrated for/at multiple temperatures with the current temperature of the cell being a parameter used to determine or select the appropriate optical device control parameters.

Figure 1A:
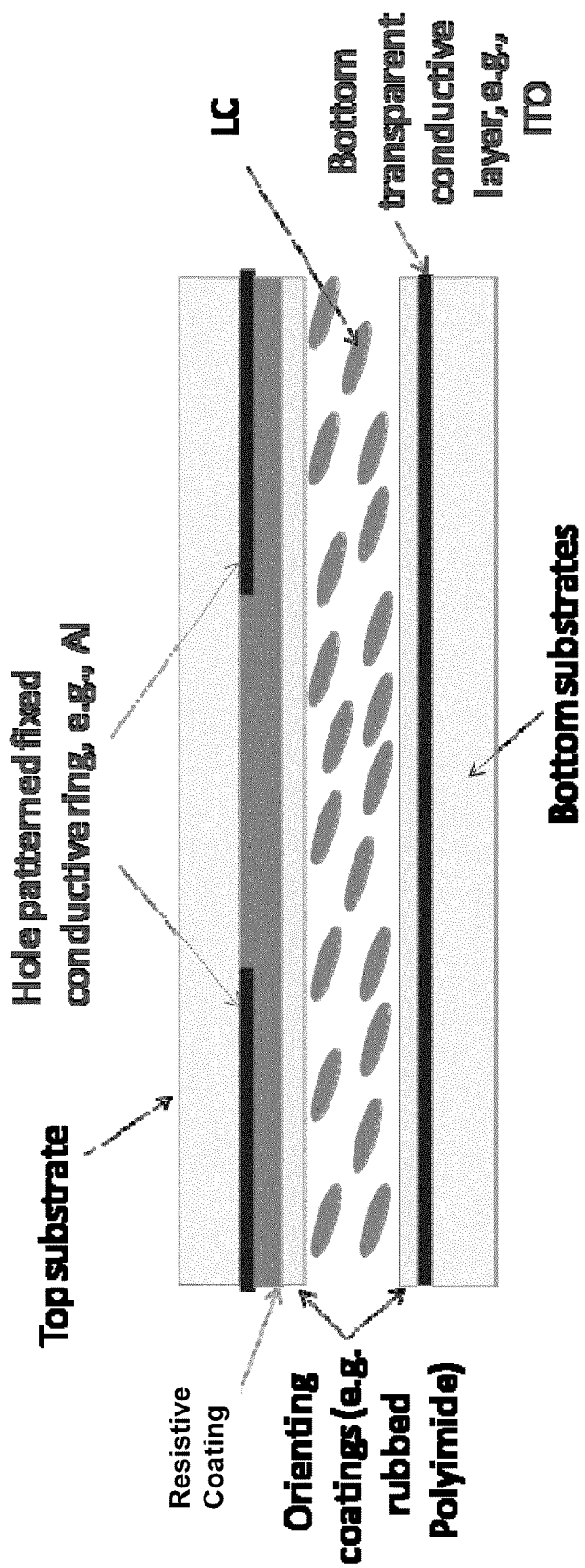
FIG. 1A is a schematic cross-sectional diagram of a prior art tunable liquid crystal lens according to Naumov et al.
Figure 1B:
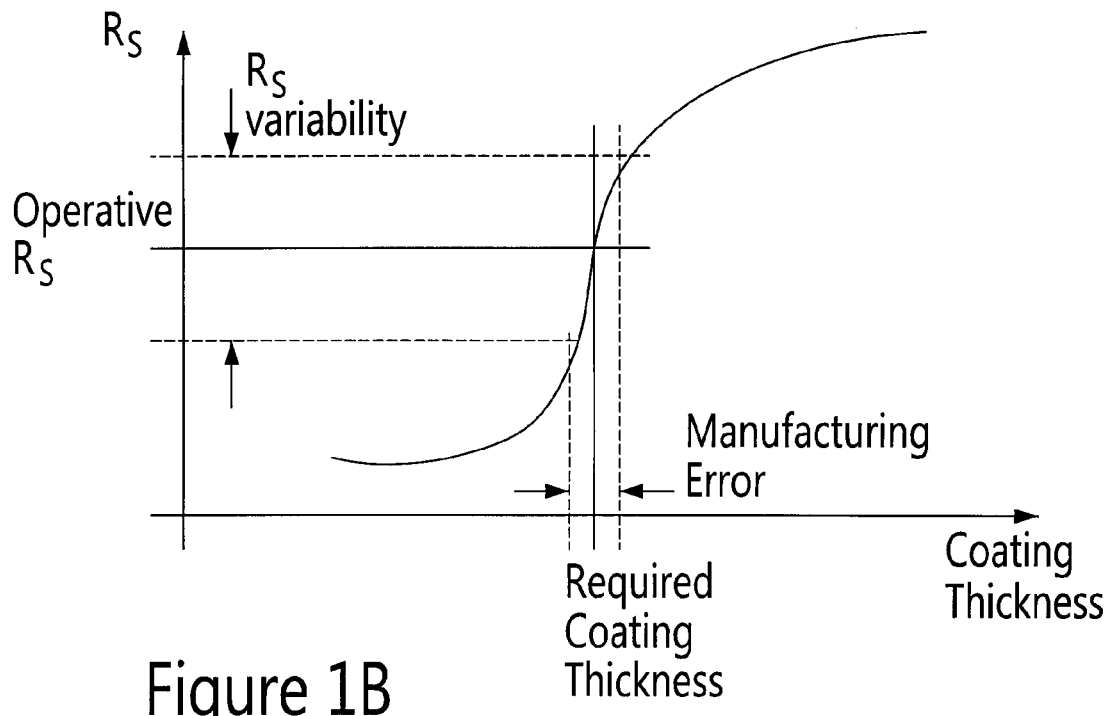
FIG. 1B is a schematic plot illustrating sheet resistance variability in a percolation zone including sheet resistance values required for useful operation of liquid crystal lenses.
Figure 4B:
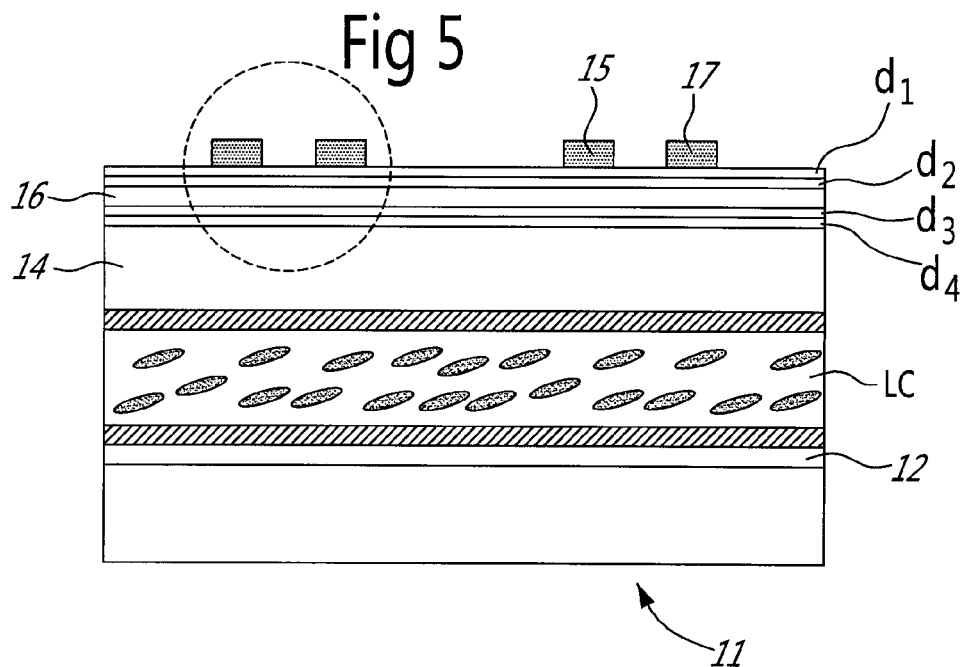
FIG. 4B is a schematic cross-sectional view along the line 4B-4B in FIG. 4A.
Figure 4A:
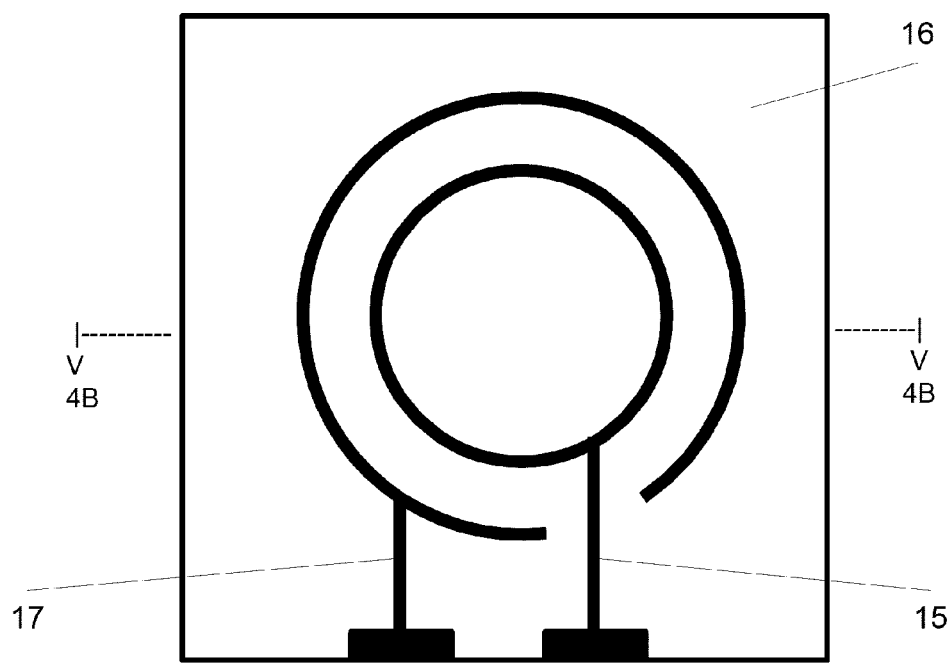
FIG. 4A is a schematic plan view of one embodiment illustrating an electrode arrangement for measuring sheet resistance via capacitive coupling in accordance with the proposed solution.

Measuring sheet resistance can be performed in a variety of ways. In the case of a thin layer of material 16 deposited on a glass substrate 14, contacting the material 16 can be difficult. As described in PCT publication WO2009/146529 published on Dec. 10, 2009, which is incorporated herein by reference, a thin layer can be contacted by providing an edge contact structure. With reference to the embodiment of FIGS. 4 to 7, it has been discovered that the use of a direct connection is avoided by using a capacitive coupling between the ring electrode 15 and a parallel electrode 17. For example:

As illustrated in FIG. 4A, the ring electrode 15 is arranged as an annular trace with a contact stem, while a parallel electrode 17 is arranged to surround the ring electrode 15 except at the stem of the electrode 15. FIG. 4B illustrates the layered geometry of a liquid crystal lens 11 acting on a single polarization of incident light. The weakly conductive layer 16 having sheet resistance $Rs=R_{16}$ and optionally frequency dependent characteristics is deposited between a representative number dielectric layers $d_1$ to $d_4$ in order to minimize index of refraction mismatches between liquid crystal lens substrate layer 14 and possibly free space in order to reduce reflections. Ring electrode 15 and surrounding electrode 17 are deposited atop dielectric layers $d_1$ and $d_2$.

Figure 5:
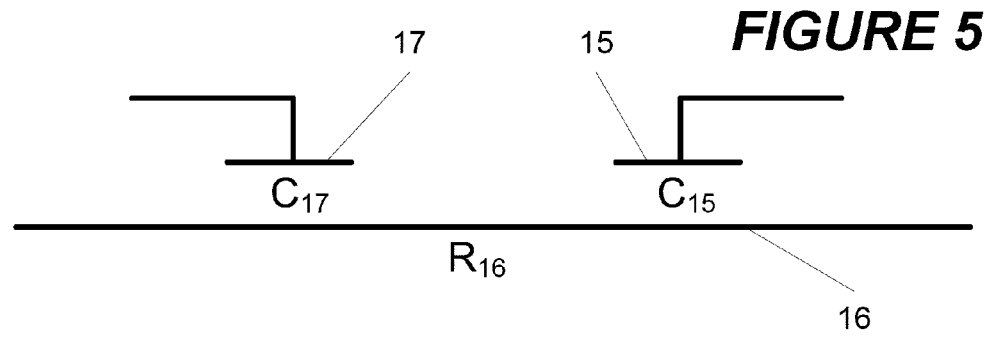
FIG. 5 is a schematic cross-sectional side view illustrating the coupling between the inner and outer electrodes illustrated in FIG. 4B.
Figure 6:
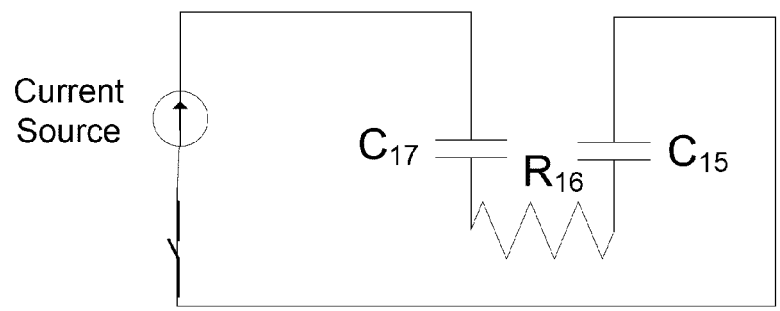
FIG. 6 is a schematic electrical diagram modeling the arrangement illustrated in FIG. 5.

FIG. 5 illustrates schematically from the side how electrodes 15 and 17 couple with the material layer 16 without direct electrical access, and FIG. 6 is a schematic diagram of the resulting resistance measurement circuit wherein capacitances $C_{15}$ and $C_{17}$ correspond to capacitive (DC and AC) properties of dielectric layers between the electrodes 15, 17 and the material layer 16. The electrodes 15 and 17 are separated from each other by a gap and the complex resistance of the annular portion of the material sheet 16 under the gap is measured.

Figure 7A:
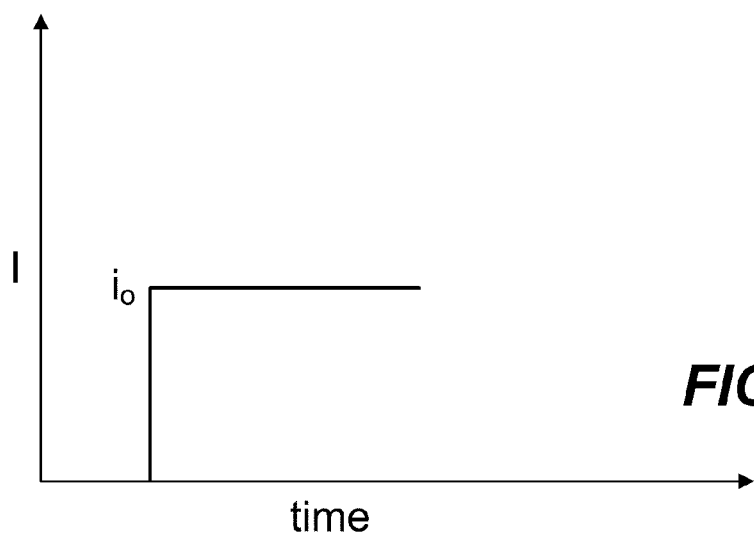
FIG. 7A is a schematic plot illustrating current variation as a function of time.
Figure 7B:
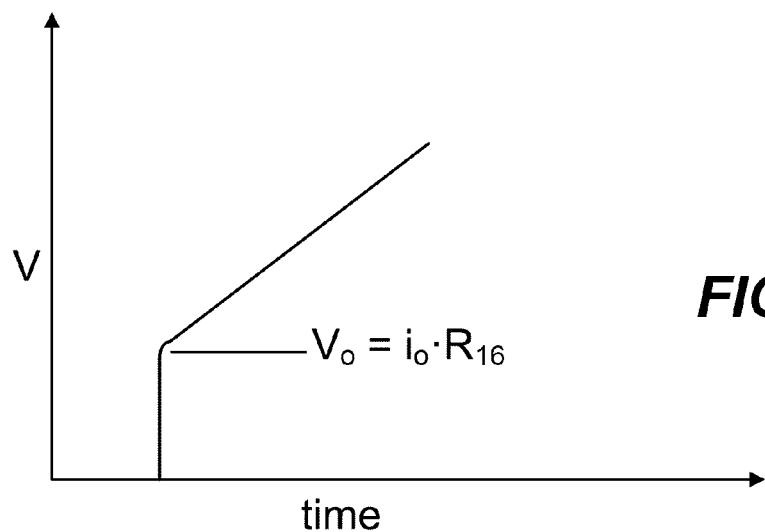
FIG. 7B is a schematic plot illustrating voltage variation as a function of time resulting from the application of a current in the equivalent circuit illustrated in FIG. 6.

As illustrated in FIGS. 7A and 7B, when a step-like current source is applied to the electrodes 15 and 17, the voltage across them initially jumps to a $V_o$ potential and thereafter rises with a substantially constant slope as the capacitors formed by the electrodes are charged. The voltage $V_o$ indicates the value of resistance of the sheet material 16 with the formula $V_o=i_o*R_{16}$. From knowledge of the constant current $i_o$ value, the sheet resistance is known from $R_{16}=V_o/i_o$. The value obtained for the sheet resistance from this equation depends on the geometry of the electrodes 15 and 17. For electrodes that are etched using conventional wafer manufacturing techniques, the consistency of the geometry is sufficient for a good estimation of the sheet resistance.

Figure 8:
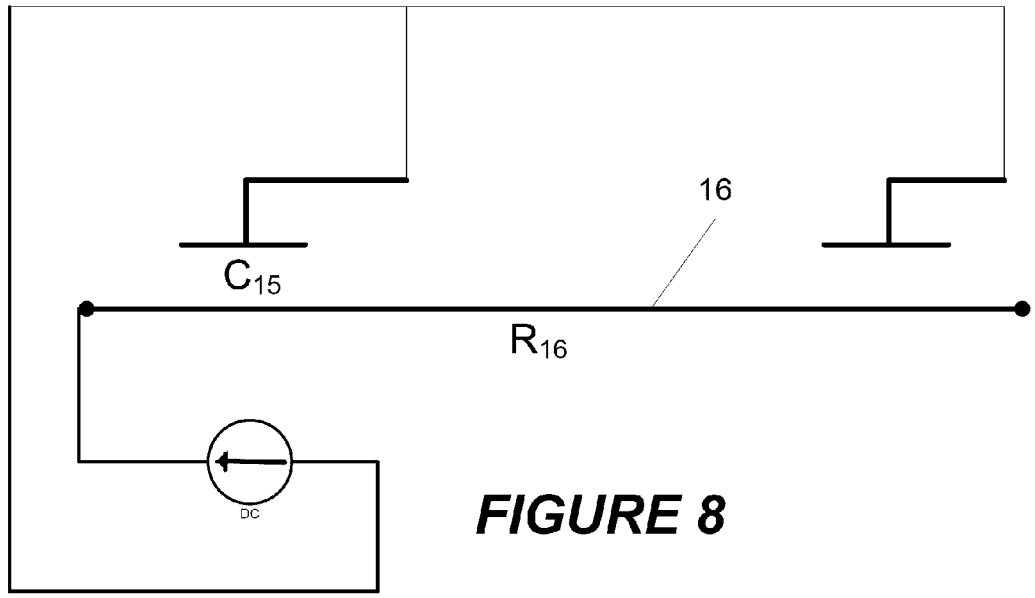
FIG. 8 is a schematic sectional view of another embodiment illustrating direct electrical connection to a layer of a frequency dependent material and capacitive coupling of the ring electrode for measuring DC resistance of the frequency dependent resistive layer.

It will be appreciated that a variety of ways are possible to measure sheet resistance $R_{16}$. For example, in the embodiment of FIG. 8, the electrode 17 is not used, and instead the ring electrode 15 is capacitively coupled to the sheet material 16 with a contact being provided for the sheet 16. In this embodiment, the circuit including the sheet 16 essentially between the contact on the edge of the sheet 16 and the near part of the ring electrode 15. The determination of sheet resistance is achieved from $R_{16}=V_o/i_o$ as in the previous embodiment, however, the accuracy may not be as good given the electrode geometry.

Figure 9:
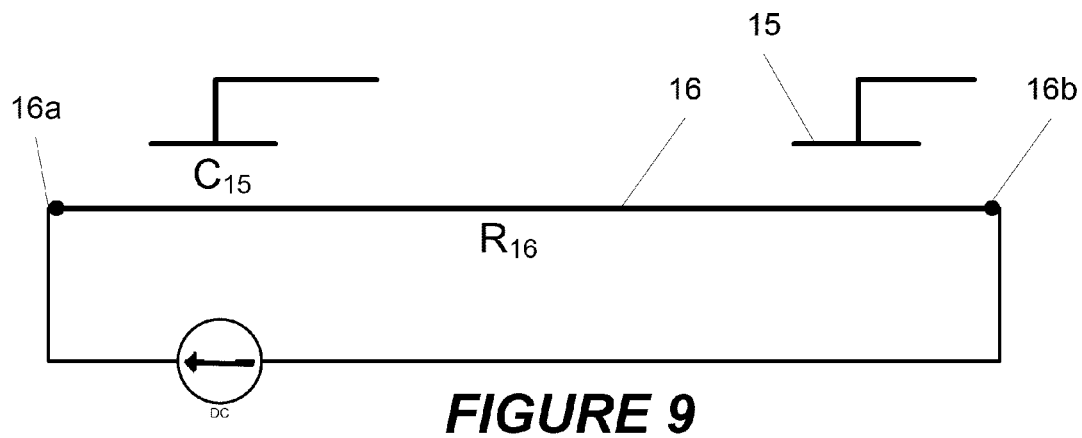
FIG. 9 is a sectional view of another embodiment showing direct electrical connection across a layer of a weakly conductive material.

In the embodiment of FIG. 9, two contacts are provided on the sheet 16 to directly measure sheet resistance. In this embodiment, the sheet resistance is simply measured by $R_{16}=V/i$. With voltage and current measured, any suitable voltage source and level can be used. The value obtained for the sheet resistance from this equation depends on the geometry of where the contacts are located, for example at the diagonals of the sheet 16.

Figure 10:
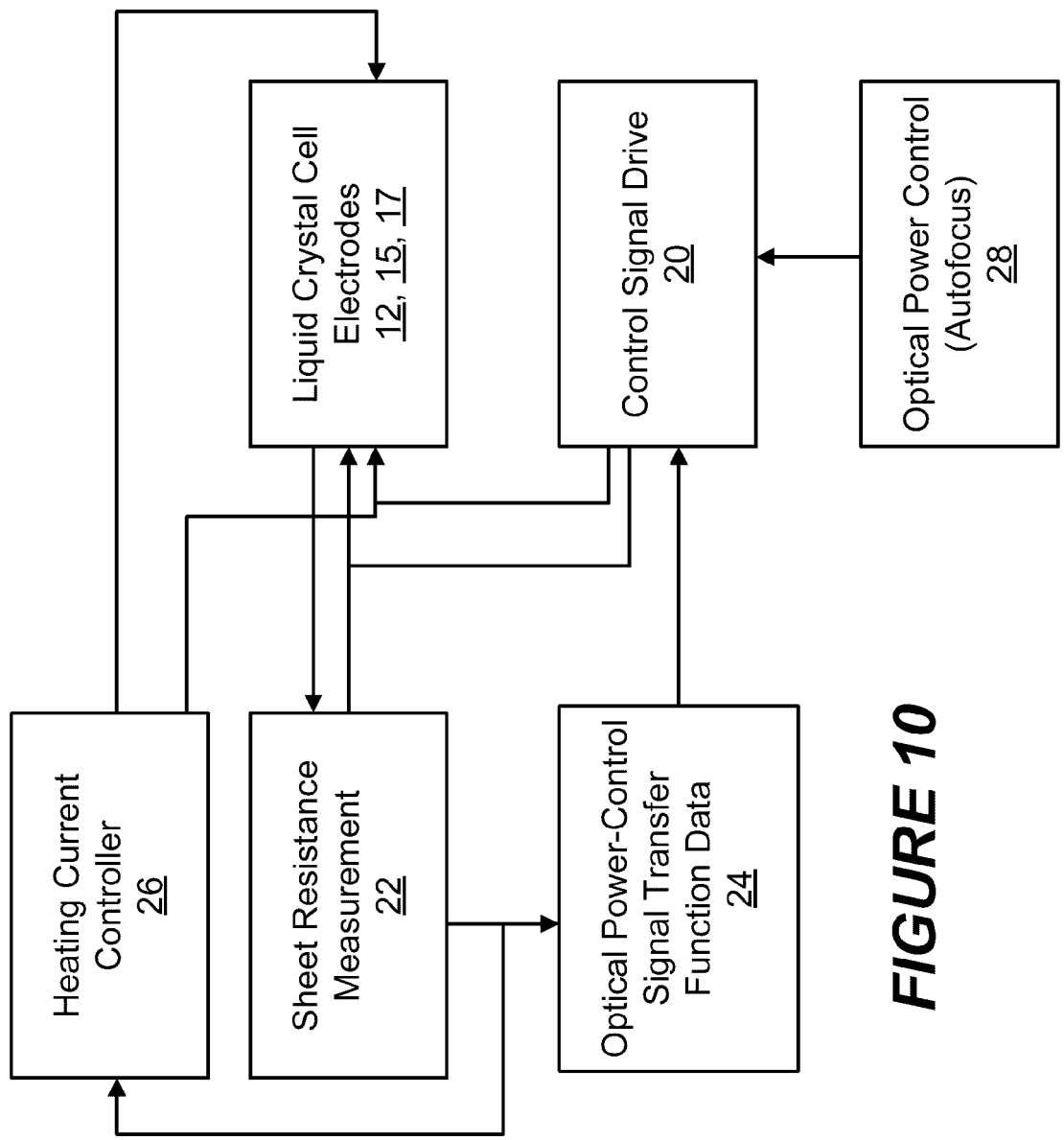
FIG. 10 is a schematic block diagram illustrating a tunable liquid crystal lens and control circuit according to an embodiment of the proposed solution.

FIG. 10 is a block diagram of an example embodiment of a control circuit using the electrode configuration of FIG. 4. As shown, the liquid crystal cell electrodes 12 and 15 are connected to a drive circuit 20. A sheet resistance measurement circuit 22 is connected to electrodes 15 and 17. A heater circuit is connected to electrode 12 at two locations to pass a heating current through an electrode 12 for heating the liquid crystal cells up to a stable and efficient operating temperature, for example, 45° C. The heater circuit can alternatively make use of any heating element instead of electrode 12.

The blocks 20 through 28 can be provided as separate circuits, modules in a single ASIC, or in a combination of software and hardware elements in a microcontroller, as desired.

When sheet resistance of the layer 16 is measured, it can be done at known temperatures to calibrate a coefficient of temperature dependence of resistivity. The temperature dependence of resistivity is known in the art. A typical mathematical relationship is $R=R_0*e^{-\beta(T-T_0)}$. Once this is known, the relationship between measured resistance and temperature is established, and this parameter or parameters are stored for use by heating controller 26. The calibration for temperature dependence can be done once at the factory.

The sheet resistance measurement circuit 22 can contain the constant current source and voltage measurement circuit in addition to the logic required to measure $V_o$ as shown in FIG. 7B. Circuit 22 outputs a value corresponding to sheet resistance to the heating controller 26 and to the transfer function data store 24. Alternatively, the resistance value can be fed to the control circuit 20.

The transfer function data store 24 contains data that relates the optical power to frequency curve illustrated in FIG. 3. It may contain coefficient parameters for calculation of transfer function values or look-up-table values. Thus, circuit 20 uses the data of store 24 to determine frequency range values and/or specific frequency values corresponding to optical power values.

The transfer function data can be determined for each specific device, or it can be determined for each type of device. In the embodiment of FIG. 10, the transfer function is determined for the type of device as a function of sheet resistance. For semiconductors like highly resistive layers, the sheet resistance decreases with the increase of temperature. As a consequence, the transfer function (optical power versus frequency) shifts towards higher frequencies.

As shown in FIG. 10, an optical power control circuit 28, for example an autofocus function, can signal the control signal circuit 20 to generate the appropriate frequency for that optical power. Autofocus control is known in the art, for example in PCT patent application publication WO2010/022080 published Feb. 25, 2010 which is incorporated herein by reference.

The invention is not limited to the above description wherein only the sheet resistance and temperature variability can be accounted for (sheet resistance decreases with temperature). As well the invention is not limited to the localized characterization enabled by the proximity of the ring electrode 15 and the surrounding electrode 17 which only allows a limited degree of penetration of the calibration currents. For example, the ring electrode 15 and surrounding electrode 17 are typically separated by about 20 µm, employing dielectric layers $d_1/d_2$ about 0.5 µm thick provides sufficient calibration current penetration to characterize the sheet resistance $R_{16}$. The following describes tunable liquid crystal lens structures and method of operation allowing for a greater degree of penetration of calibration currents and therefore enabling accounting for further optical device parameter variability. For example:

Parametric Liquid Crystal Lens

Having described the use of calibration currents in a Liquid Crystal (LC) lens, it is understood that the above description relates to otherwise ideal manufacturing conditions (other than sheet resistance manufacturing variability) and applications wherein such LC lenses can be positioned with a high degree of accuracy and precision. For example the uniformity of the LC lens across the hole patterned electrode aperture can be less than theoretically possible, manufacturing of optical assemblies including LC lenses can introduce abnormalities/aberrations (astigmatism, coma, dispersion, optical axis tilt, optical axis shift, etc) either in fabricating the lens itself or in the overall optical assembly. As another example, the LC lens use application itself may require image stabilization. There is a need to address at least these scenarios.

Figure 11B:
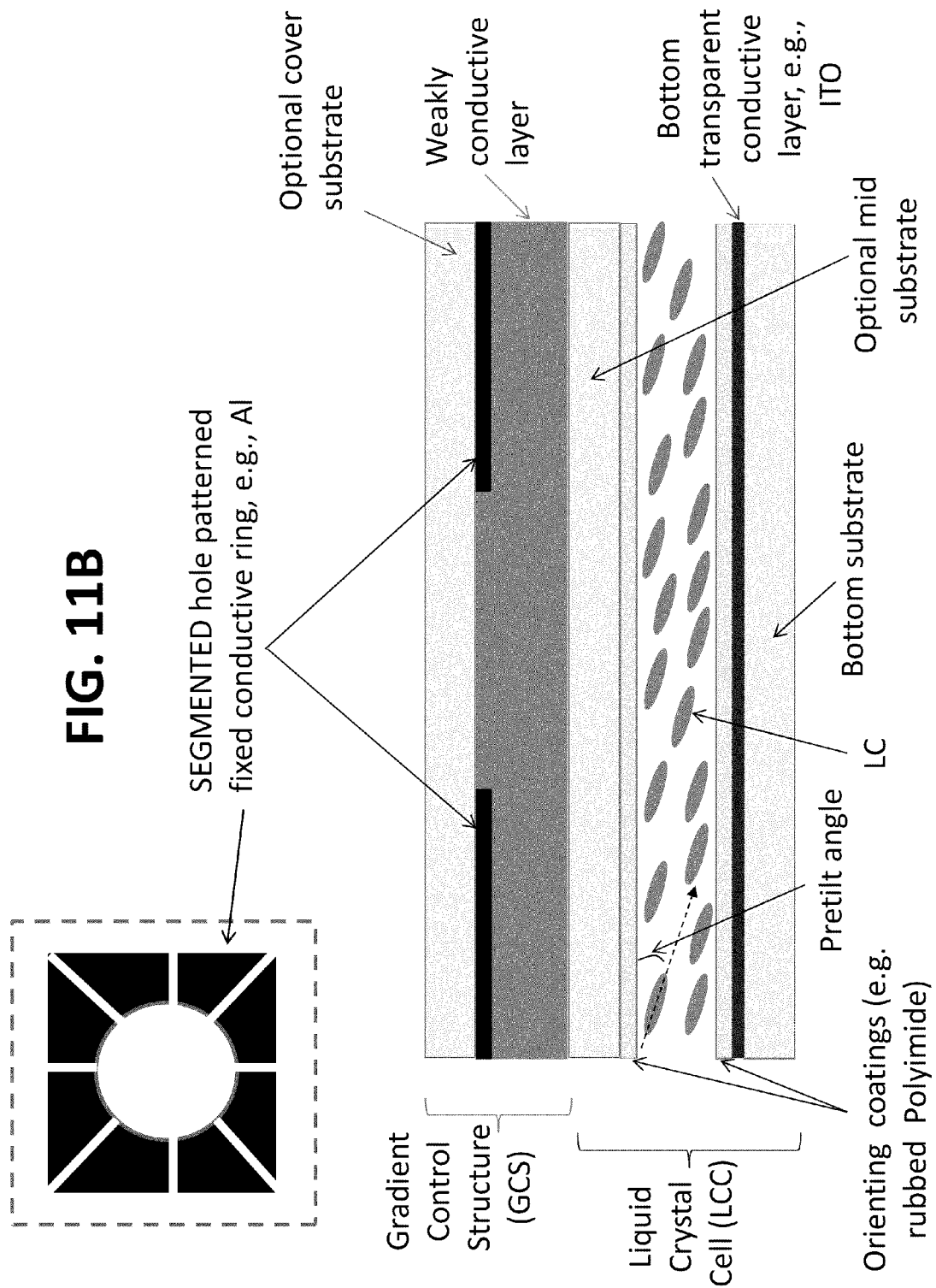
FIG. 11B illustrates a side sectional view of a tunable liquid crystal lens with an inset top view of a segmented top electrode according to an embodiment in which a frequency dependent material is below the segmented, hole patterned electrode.

FIG. 11A illustrates a side sectional view of a Tunable Liquid Crystal Lens (TLCL) with an inset top view of a segmented top electrode according to an embodiment of the proposed solution in which a frequency dependent material is above the segmented, hole patterned electrode. The positioning of the frequency dependent material can be on top of and covering the segmented electrode or underneath the segmented electrode (see FIG. 11B) with the understanding that dielectric layers such as $d_1$ to $d_4$ are illustrated in FIG. 4B are present.

By varying only the voltage amplitudes of common frequency control drive signal components fed to the segments a complex electric field spatial modulation can be provided by the geometry. Alternatively, the complex electric field spatial modulation can be provided by varying the frequencies of the drive signal components supplied to the segments. Weakly conductive layer functionality having frequency dependent material is employed on a per electrode segment basis in order to provide a combined effect to which all electrode segments contribute. That is, local charge penetration in the frequency dependent layer is controlled by each electrode segment to control the extent of the patterned electrode in the corresponding immediate vicinity of each electrode segment. The combined extent of all electrode segments is used to spatially modulate the electrical field in a complex way. The complex spatial modulation of the electric field in turn imparts a particular optical effect to the incident beam via a complex director orientation in the LC layer exhibiting a complex refractive index distribution across the LC layer. In the most general sense, the optical element provided by the LC layer is caused to "change shape" in the sense of providing a particular programmed refractive index distribution. The TLC lens can be calibrated with a desired control drive signal of a frequency and an amplitude for each segment as a function of a desired optical effect. A variety of effects can be applied to an incident beam.

Without limiting the invention, for video/image acquisition applications specific sets of frequency and amplitude drive signal components are useful and a controller can draw on calibrated values from a calibration look-up-table. For example, optical power adjustment and optical axis reorientation are used in video/image acquisition to provide focusing functionality and to stabilize the image to be acquired by moving the optical axis of the TLC lens to compensate for camera motion (handheld/vibration environment). For image tracking applications, optical axis reorientation is employed to keep stable a moving scene.

Figure 13:
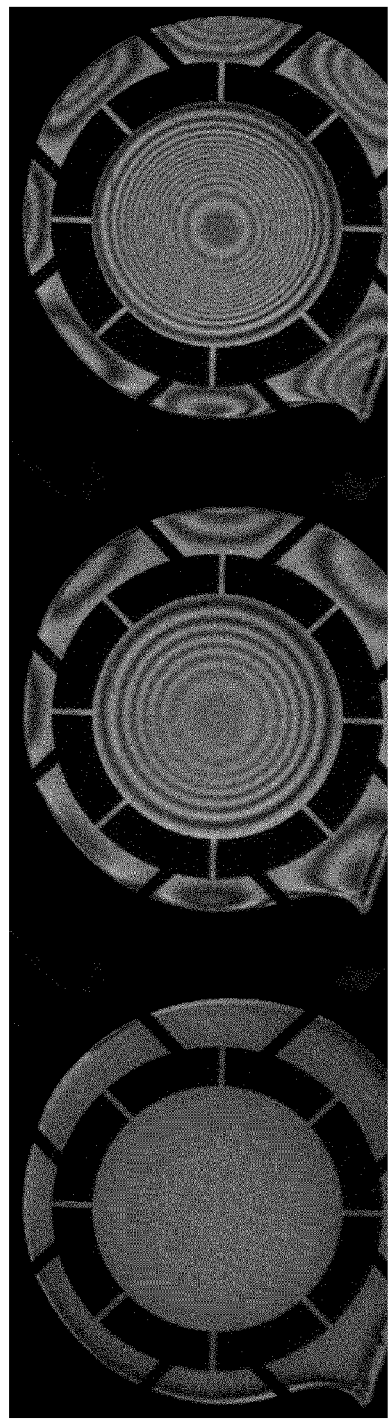
FIG. 13 illustrates experimental results showing optical power variation with frequency of a drive signal applied to all segments of a segmented electrode.
Figure 13:
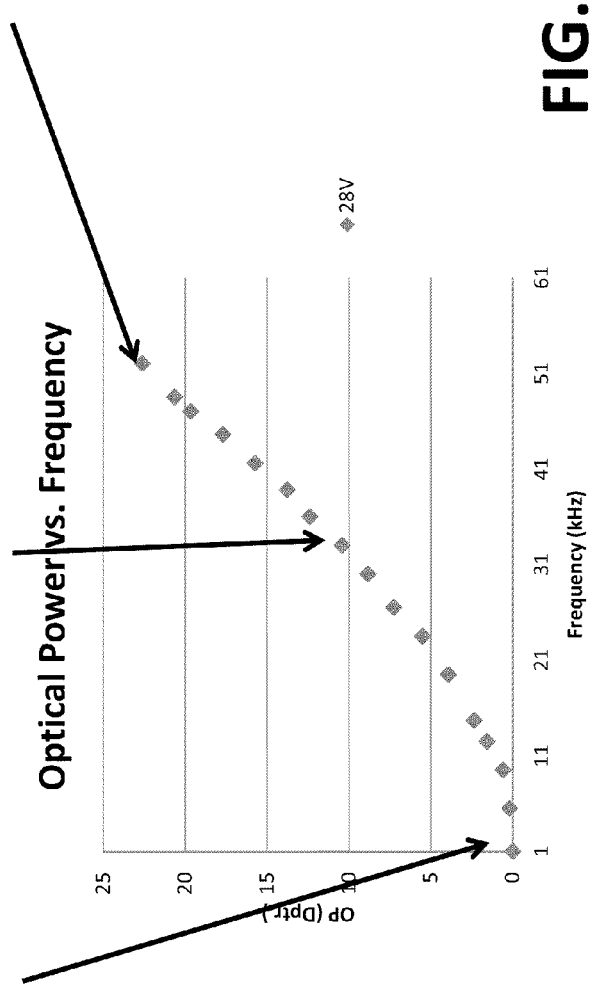
Figure 14:
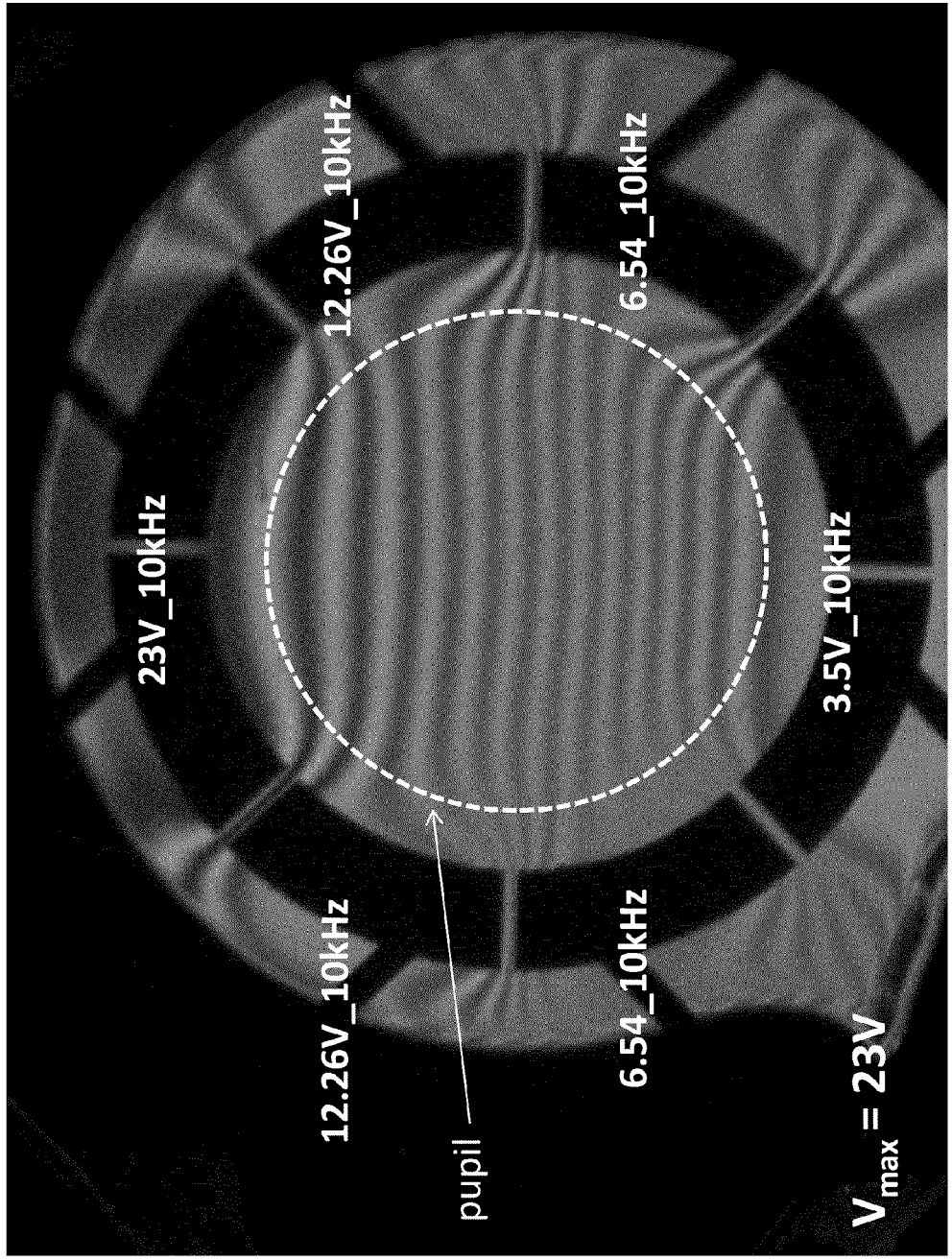
FIG. 14 illustrates experimental results showing angular optical axis reorientation.

The operation of such a TLC lens with segmented electrodes and frequency dependent weakly conductive layer can best be illustrated with reference to FIG. 12 which describes optical beam shaping modes typically employed in video/image acquisition. An LC layer having a spatially invariant refractive index distribution across the TLCL aperture does not introduce differential changes in an incident optical beam and a planar phase front propagates without change. The LC layer operates much like a slab of glass (ignoring polarization effects). An LC layer having a spatially variant refractive index distribution across the aperture which is symmetric lenticular causes an incident planar phase front to focus. FIG. 13 illustrates optical power variation with the frequency of a 28V amplitude drive signal applied to all electrode segments. An LC layer having a spatially variant refractive index distribution across the aperture which is linearly variant causes an incident planar phase front to tilt or pan (angular optical axis reorientation). FIG. 14 illustrates angular optical axis reorientation for a ring electrode of a 1.85 mm diameter with a usable pupil of 1.49 mm. Applications of angular optical axis reorientation includes beam steering. Combined optical beam shaping can be provided by tilting/panning and focusing in a single TLCL using the same frequency dependent material weakly conductive layer and LC layer which results in shifting the optical axis. FIG. 15 illustrates a top view of a liquid crystal lens of the embodiment of FIG. 11A in different states of shift of the optical axis using the segmented electrodes. For certainty, the combined drive signal applied to the segmented electrodes includes frequency mixing wherein at least one frequency with appropriate voltage amplitude(s) is applied to provide optical power control in focusing an image and at the same time another frequency with appropriate voltage amplitudes is applied to provide beam steering control in image stabilization.

Figure 12:
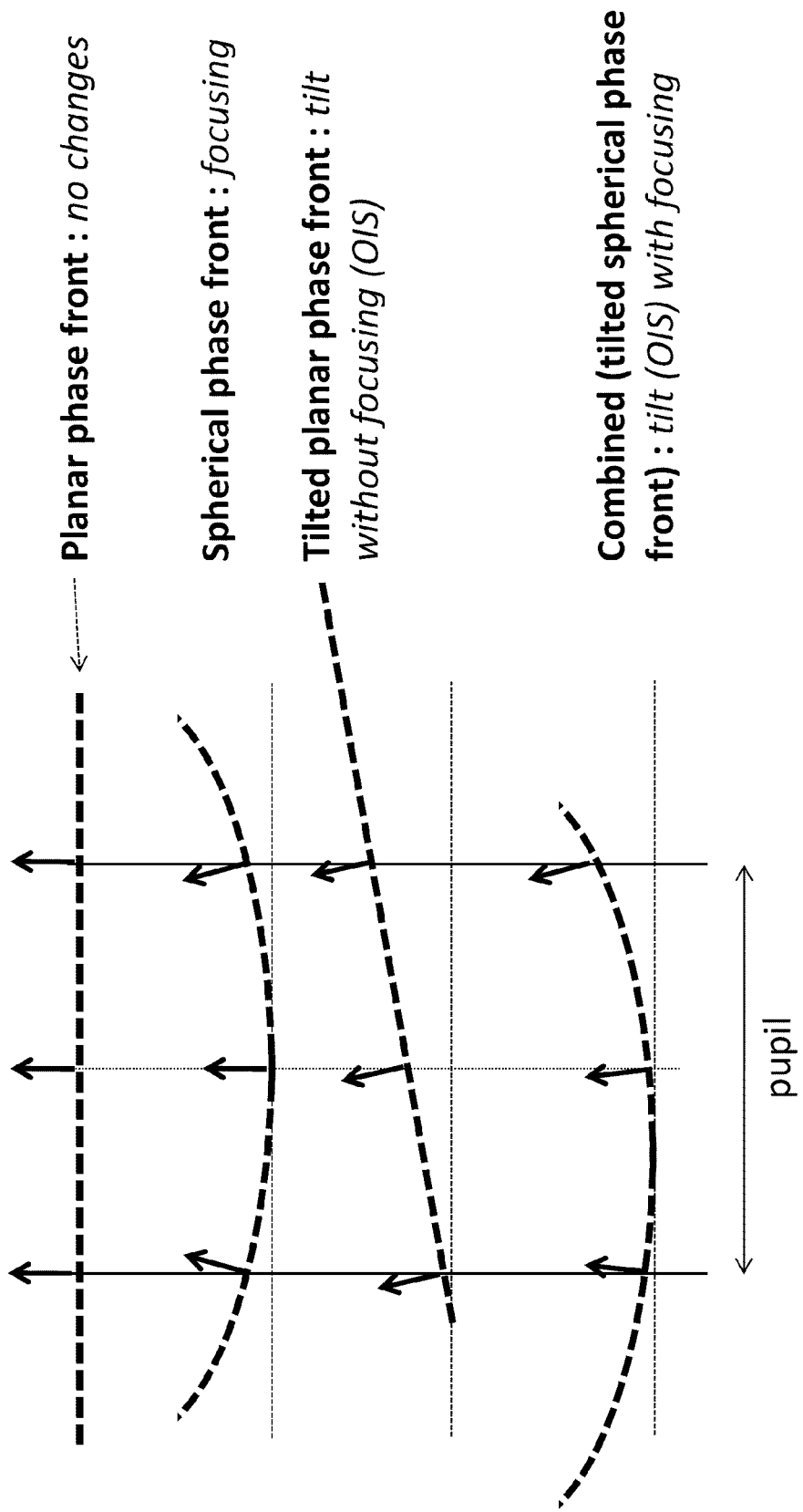
FIG. 12 is a schematic diagram illustrating optical beam shaping modes.
Figure 16:
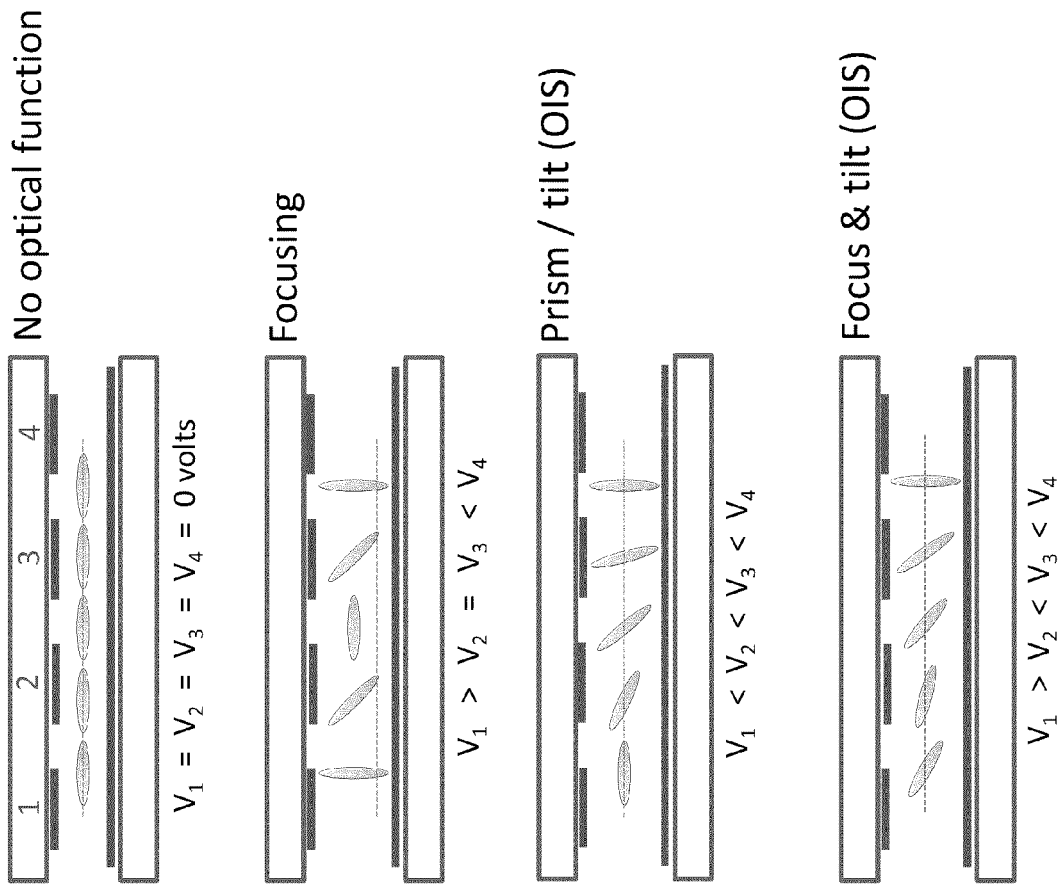
FIG. 16 schematically illustrates LC layer refractive index distributions corresponding to the wave fronts illustrated in FIG. 12.
Figure 16:
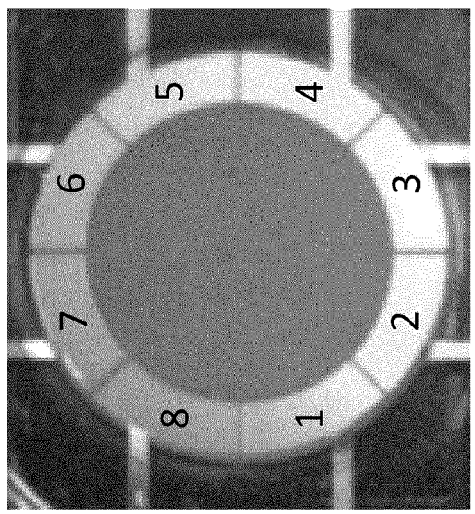

FIG. 16 illustrates refractive index distributions in the LC layer corresponding to the wave fronts presented in FIG. 12 for a ring electrode having eight segments. Examples of relative voltage amplitudes of segment driving signal components are shown ($V_4=V_5$, $V_3=V_6$, $V_2=V_7$, $V_8=V_1$), for simplicity the corresponding frequencies are omitted.

It is important to reemphasize that a TLC lens having a frequency dependent weakly conductive layer implementing functionality described hereinabove can be employed in providing image stabilization, for example by employing a suitable feedback mechanism such as, but not limited to, an accelerometer. Image stabilization is important in handheld applications as well in vibrating environments. Employing an active feedback mechanism and active image stabilization is enabled by a fast TLCL response. A fast TLCL employing the above described weakly conductive layer is described in co-pending commonly assigned U.S. 61/422,115 entitled "Fast Tunable Liquid Crystal Optical Apparatus and Method of Operation" filed Dec. 10, 2010 which is incorporated herein by reference.

Figure 18:
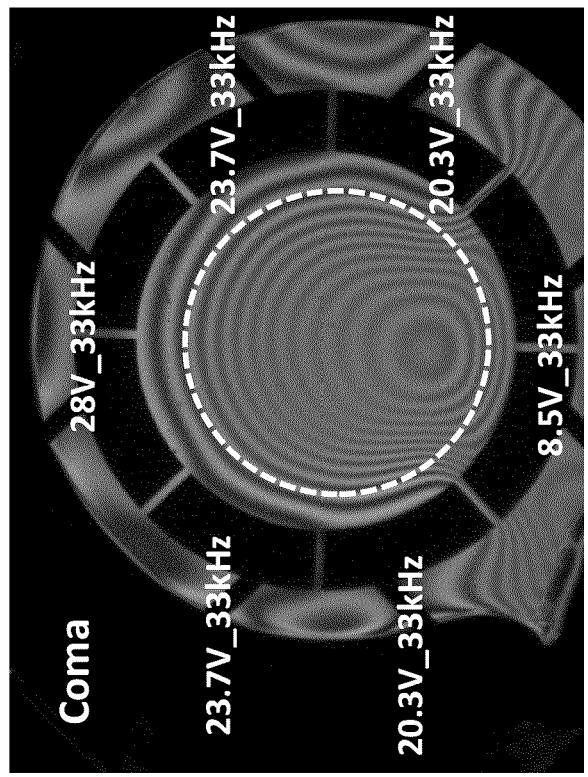
FIG. 18 illustrates a segmented electrode TLC lens configured to compensate for coma errors.
Figure 17:
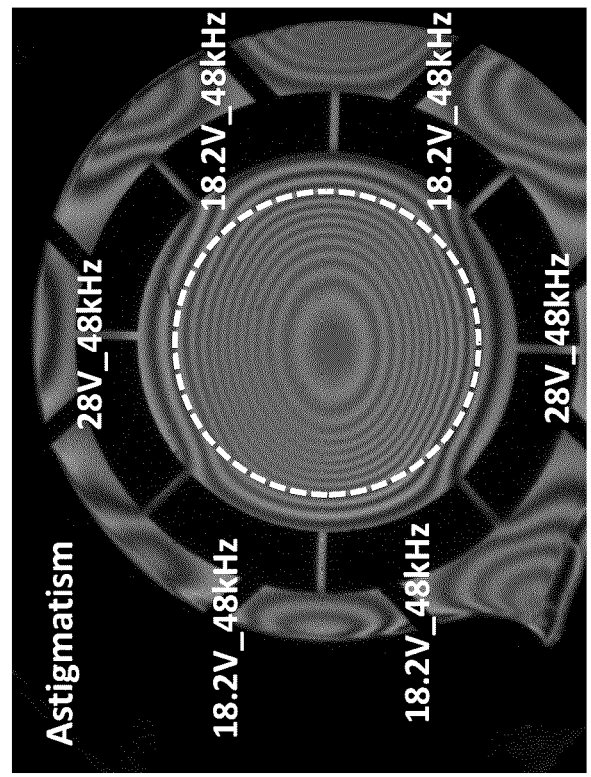
FIG. 17 illustrates a segmented electrode TLC lens configured to compensate for astigmatism errors.

The proposed solution can also be applied to manufacturing wherein particular drive signal components are employed to cause the segmented electrode TLC lens with frequency dependent weakly conductive layer to compensate for manufacturing/assembly defects, in this sense such segmented electrode TLC lens can be understood as a parametric (lens) optical element. FIG. 17 illustrates a segmented electrode TLC lens configured to compensate for astigmatism errors. FIG. 18 illustrates a segmented electrode TLC lens configured to compensate for coma errors. Coma errors differ from optical axis shifting at least in that the modified wave front does not focus at the same point in the same plane.

The invention is not limited to the above described parametric TLC lens which implements both lens functionality and image stabilization/error correction/steering/vibration reduction/etc. using the same segmented electrode, frequency dependent weakly conductive layer and LC layer.

Figure 19A:
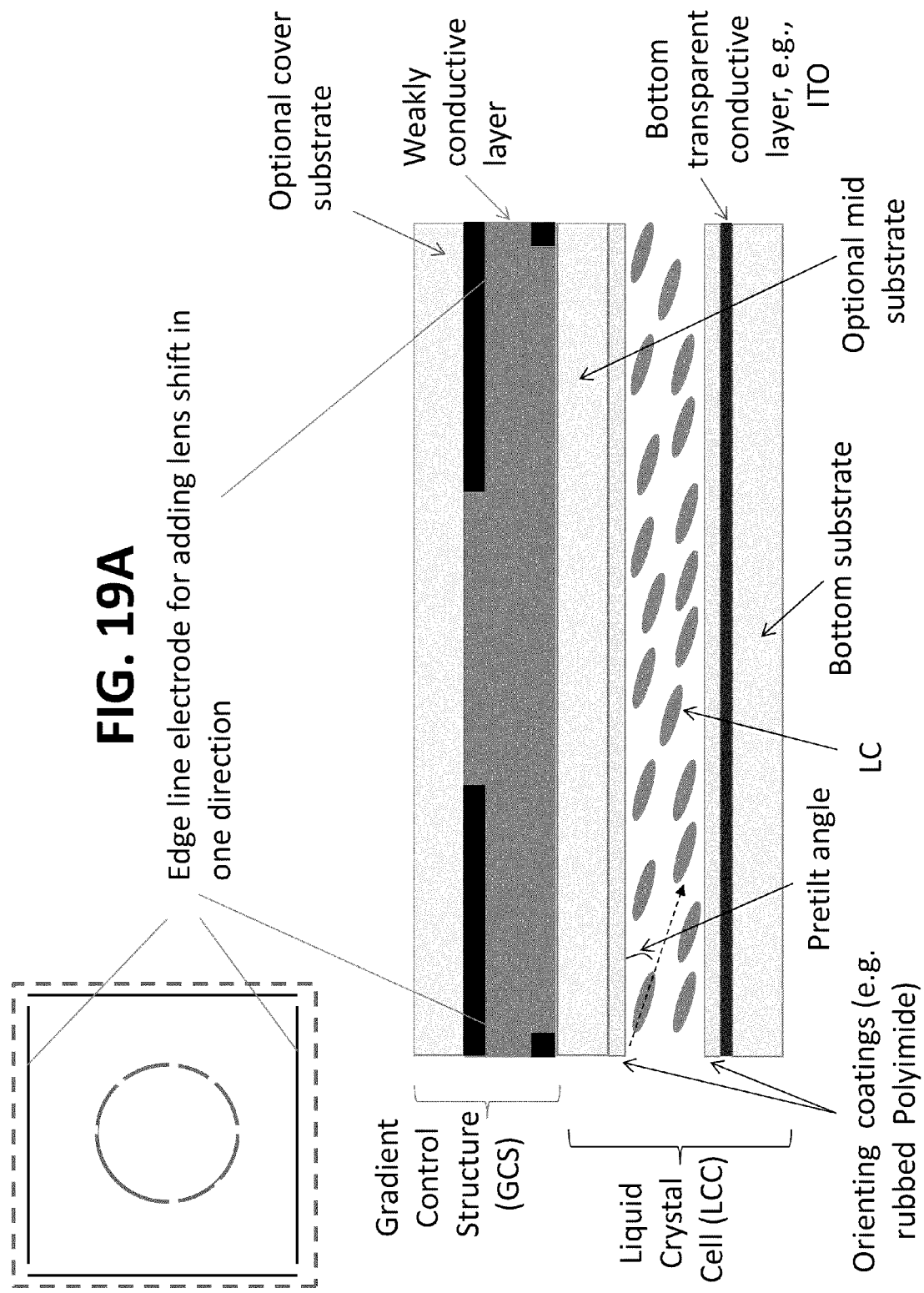
FIG. 19A illustrates a side sectional view of a tunable liquid crystal lens with an inset top view of a top, hole patterned electrode with additional lateral electrodes placed under the top hole patterned electrode according to an embodiment.
Figure 19B:
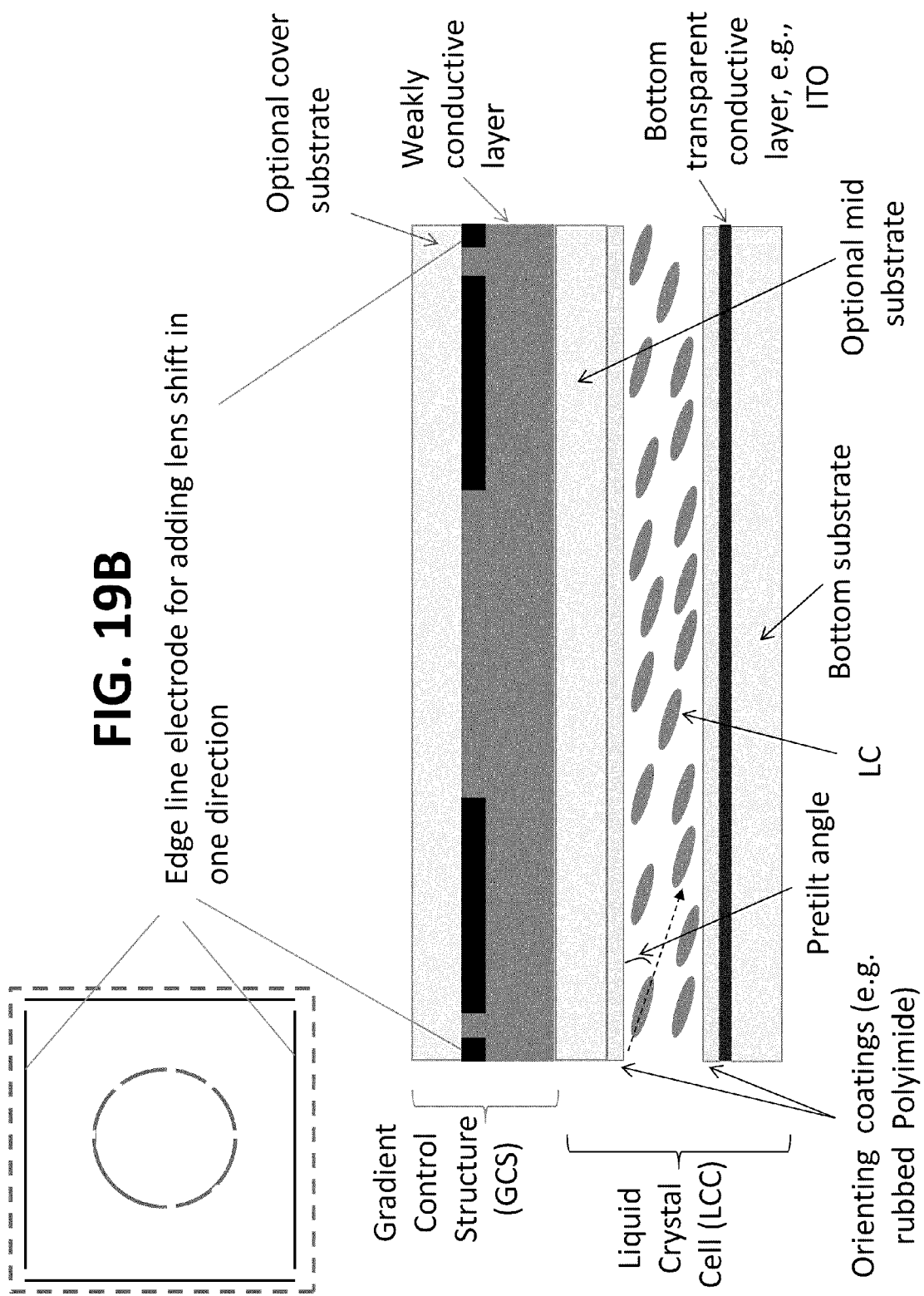
FIG. 19B illustrates a side sectional view of a tunable liquid crystal lens with an inset top view of a top, hole patterned electrode with additional lateral electrodes placed outside of periphery of the top hole patterned electrode according to an embodiment.

For example, the shifting of the electric field can be achieved in the layered structure without using a segmented electrode. For example, FIG. 19A illustrates a side sectional view of a tunable liquid crystal lens with an inset top view of a top, hole patterned electrode with additional lateral electrodes placed under the top hole patterned electrode. In this embodiment, a frequency is applied to a lateral or side electrode that increases the electric field across the liquid crystal cell in a manner that decreases from one side to the other which causes an introduction of an optical power differential (wedge) higher on one side compared to the other. This type of control is a type of beam steering that can be combined with lens formation. The side electrodes can be under the hole patterned electrode as shown or on a same substrate level on an outside of the periphery of the hole patterned electrode as shown in FIG. 19B. Notably, the shift produced is independent of the rest of the TLC lens structure.

Figure 20:
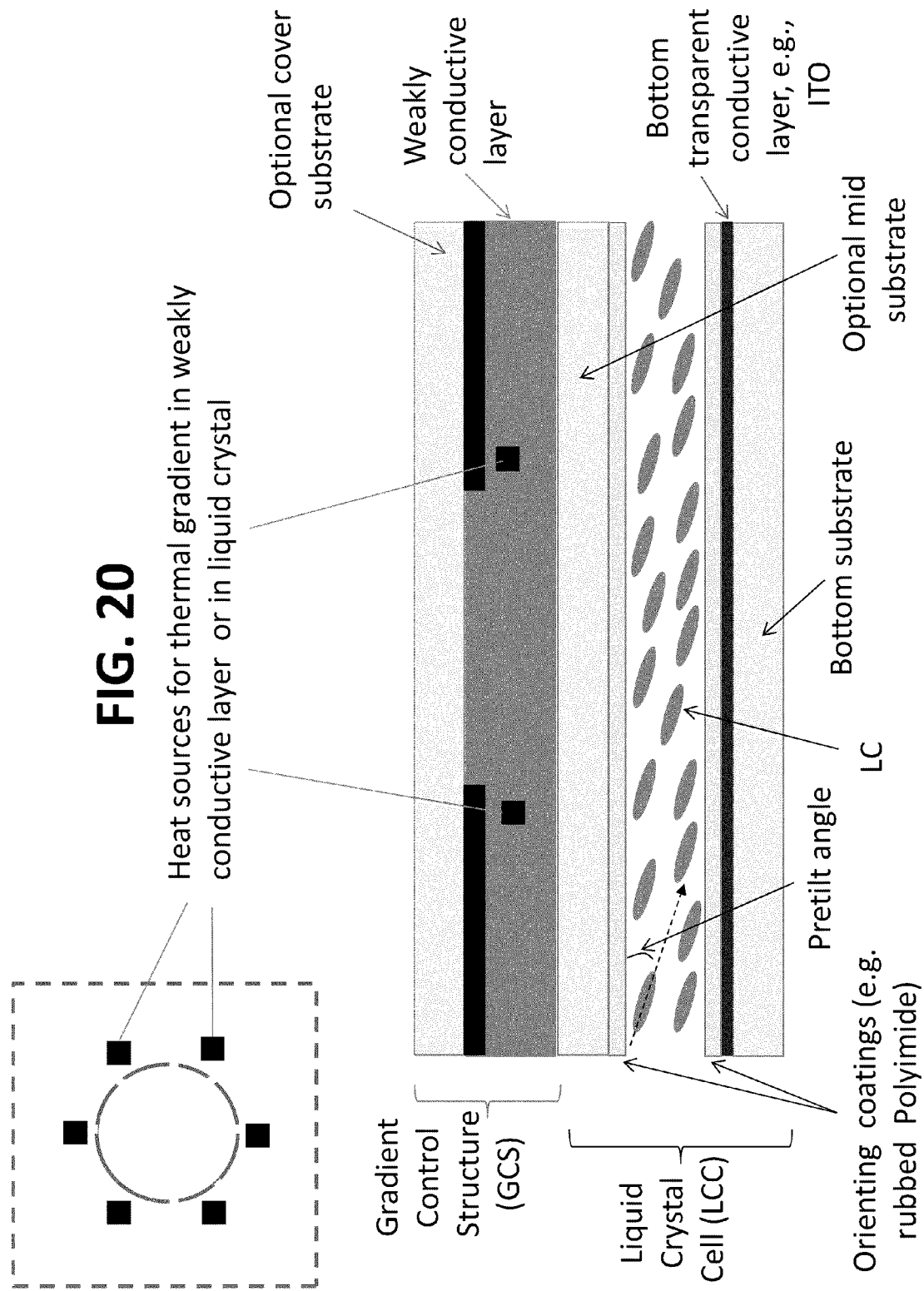
FIG. 20 illustrates a side sectional view of a tunable liquid crystal lens with an inset top view of a top, hole patterned electrode with additional resistive heat sources placed under the top hole patterned electrode according to an embodiment.

Similarly, the behavior of the frequency dependent material can be affected by temperature. As shown in FIG. 20, the creation of a controllable thermal gradient within the frequency dependent material layer can be used to move the optical axis of the lens. The temperature also affects the ability of the liquid crystal to change orientation, and thus this approach can be used within the liquid crystal layer as well. It will be appreciated that this technique for shifting the optical axis causes the introduction of an optical power differential (wedge) higher on one side compared to the other, and can be used independent of the manner in which liquid crystal orientation is provided to cause the lensing effect.

Figure 21:
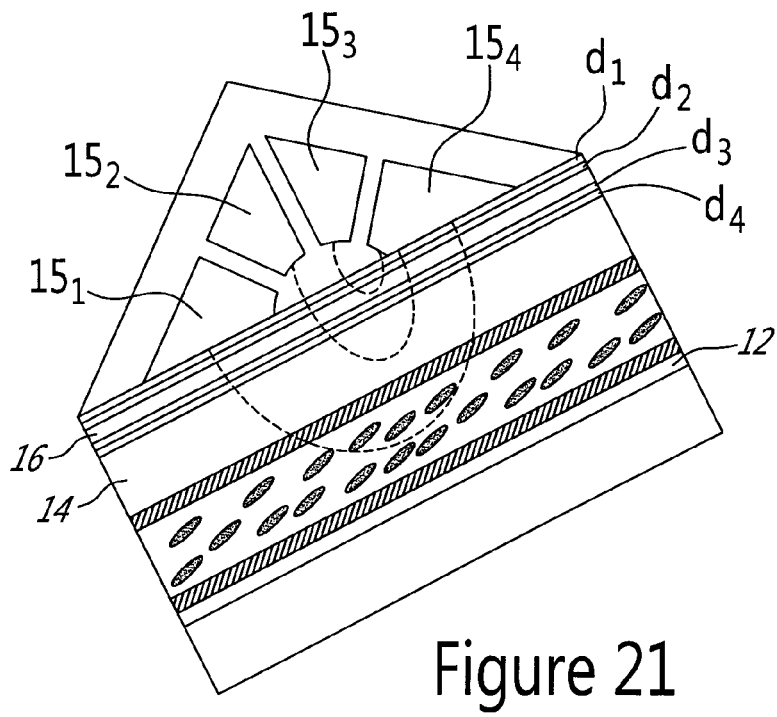
FIG. 21 is a schematic diagram illustrating an elevational view of a diagonal cross-section through a tunable liquid crystal lens having a segmented hole-patterned electrode such as illustrated in FIG. 11B and schematic calibration current penetration.

FIG. 21 illustrates a cross-section through a TLCL having a segmented electrode such as illustrated in FIG. 11B. The depiction is greatly exaggerated in the vertical dimension in order to emphasize the presence of other layers such as dielectric layers $d_1$ to $d_4$ and to illustrate calibration current penetration. In operation a calibration current is supplied to an electrode segment, for example $15_1$ and electrical potential measurements, static and/or time dependent, are made at the other electrodes $15_2$, $15_3$, $15_4$, etc. which are allowed to float. Depending on the calibration method, ITO electrode 12 can be grounded or allowed to float as well. Deeper calibration current penetration is enabled by the greater distance between electrode segment pairs with 151 which is orders of magnitude higher than the 20 µm of the geometry illustrated in FIG. 4B as the ring aperture of the geometry illustrated in FIG. 21 can be about 2 mm or larger. Calibration current penetration is illustrated by the dashed curves into the body of the TLCL.

Figure 22:
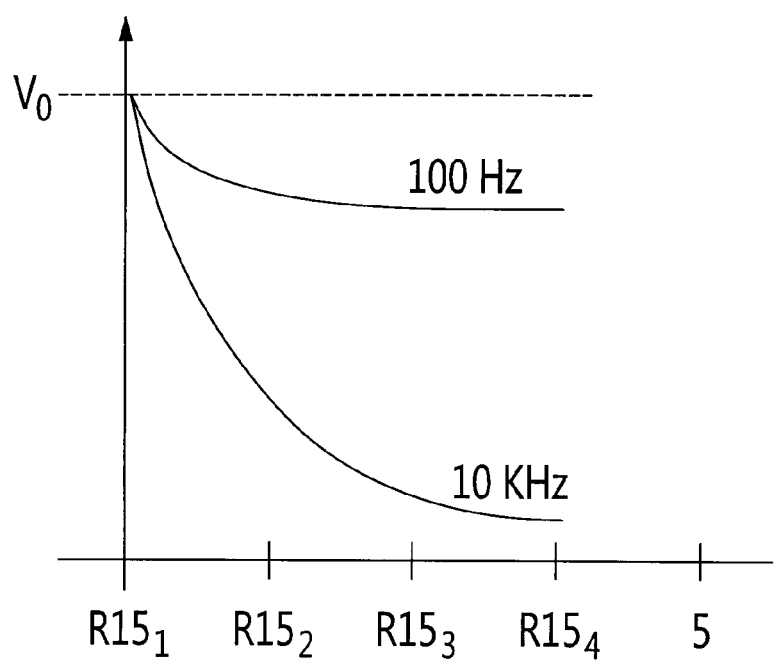
FIG. 22 is a schematic plot illustrating various potentials experienced by floating ring electrode segments as a calibration signal is supplied to a segment in characterizing the tunable liquid crystal lens.

Without limiting the invention, FIG. 22 illustrates examples of potentials experienced by floating electrodes for example with changes in frequency. The top curve corresponds to a low frequency calibration current and the bottom curve corresponds to a high frequency calibration current.

Figure 23A:
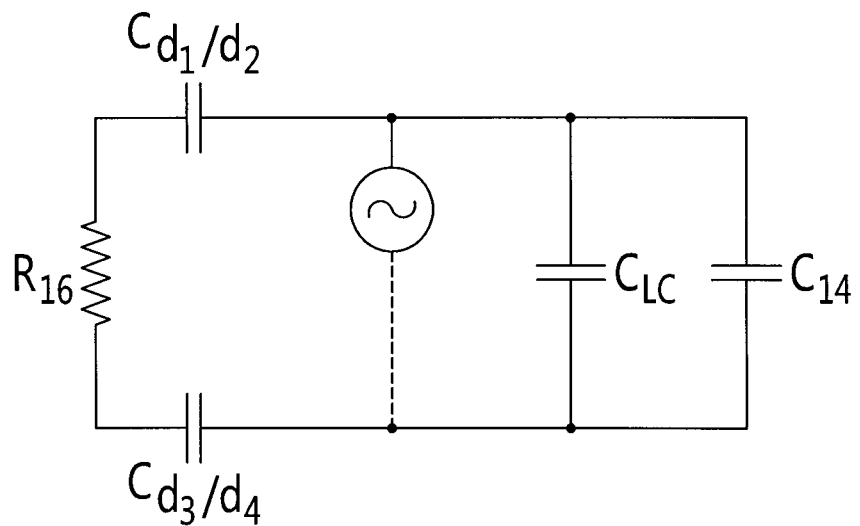
FIG. 23A illustrates a simplified equivalent circuit for the TLCL geometry illustrated in FIG. 11A.
Figure 23B:
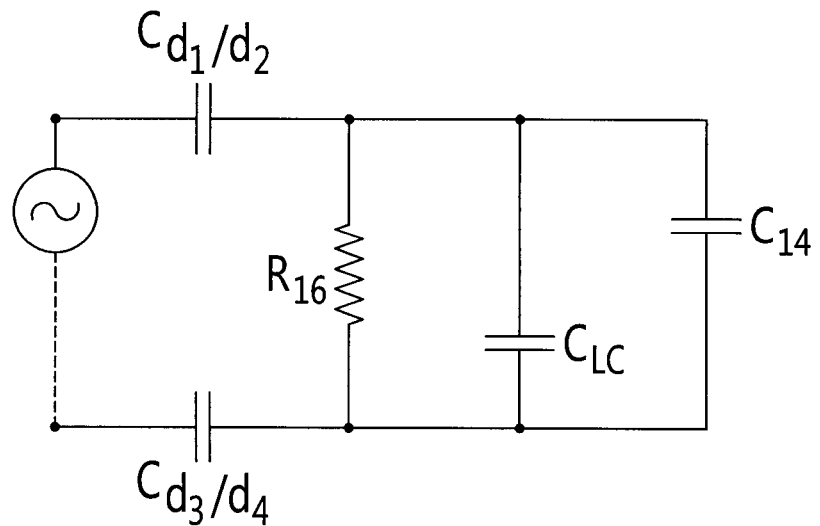
FIG. 23B illustrates a simplified equivalent circuit for the TLCL geometry illustrated in FIG. 11B.

FIG. 23A illustrates a simplified equivalent circuit for the TLCL geometry illustrated in FIG. 11A where the sheet material 16 located above the segmented hole patterned electrode 15 introduces electrical effects in parallel to the effects introduced by the LC layer. FIG. 23B illustrates a simplified equivalent circuit for the TLCL geometry illustrated in FIG. 11B where the sheet material 16 located below the segmented hole patterned electrode 15 introduces electrical effects in series to the effects introduced by the LC layer.

Figure 24A:
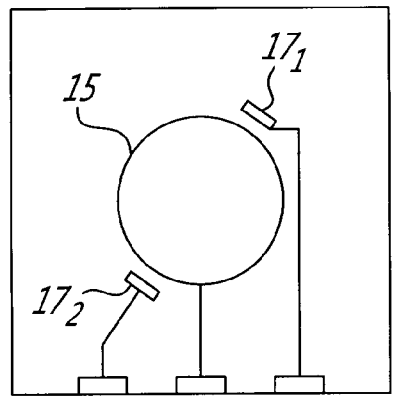
FIGS. 24A, 24B and 24C are schematic diagrams illustrating top electrode patterning in accordance with the proposed solution.
Figure 24B:
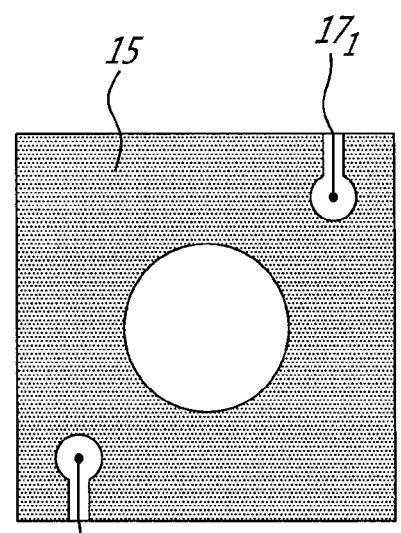
Figure 24C:
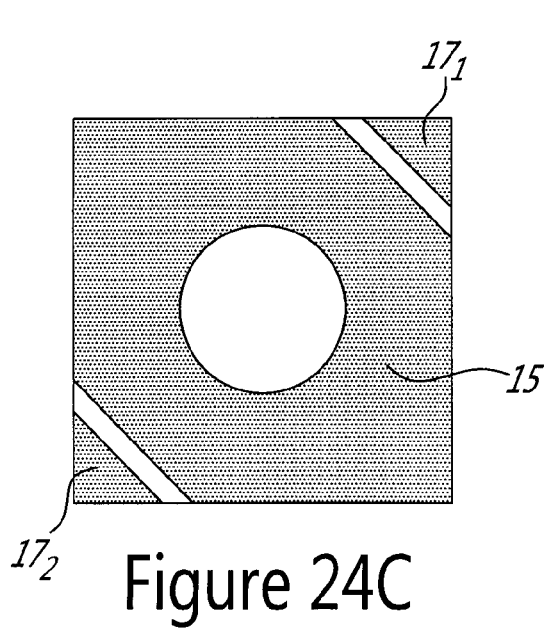

It is understood that the above description provides an implementation of the proposed solution without changes to tunable liquid crystal lenses in use. FIGS. 24A to 24C illustrate example implementations of the proposed solution for liquid crystal lenses without segmented electrodes, wherein spatially separated electrical pads $17_1/17_2$ or electrode (15) layer portions are used to determine the electrical characteristics of the liquid crystal lens.

Figure 15A:
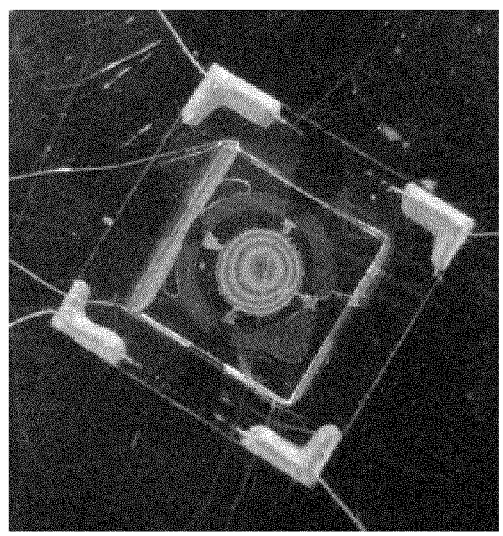
FIGS. 15A to 15D illustrate a top view of a liquid crystal lens of the embodiment of FIG. 11A in different states of shift of the optical axis using the segmented electrodes.
Figure 15D:
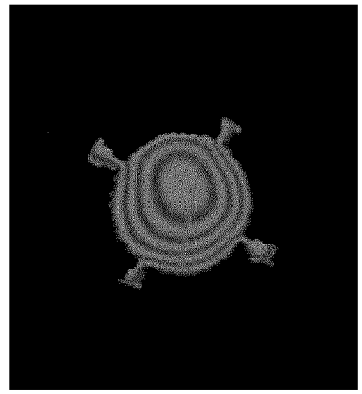
Figure 15C:
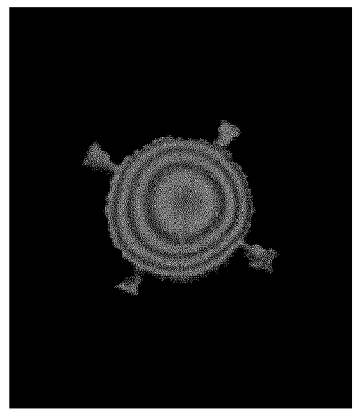
Figure 15B:
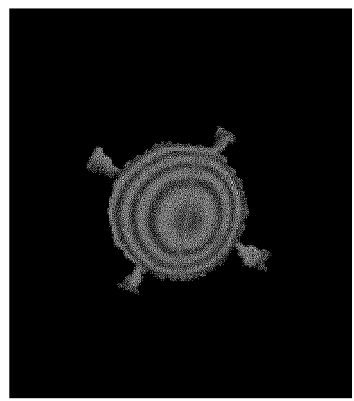

While the proposed solution has been described with reference to a TLCL structure generally illustrated in FIGS. 4A and 4B, preferably in FIGS. 11A and 11B and FIG. 15A, the invention is not limited thereto; a variety of TLCL layered structures are disclosed, for example in co-pending commonly assigned U.S. Provisional Patent application 61/289,995 filed 23 Dec. 2009, co-pending commonly assigned International Patent Application WO 2010/006,420 claiming priority from U.S. Provisional Application 61/080,493 filed 14 Jul. 2008, International Patent Application WO 2010/006,419 entitled "Surface Programming Method and Light Modulator Devices Made Thereof" filed Jul. 14, 2009, and International Patent Application WO 2007/098,602 entitled "Method and Apparatus for Spatially Modulated Electric Field Generation and Electo-Optical Tuning using Liquid Crystals" filed 2 Mar. 2007 all of which are incorporated herein by reference.

Figure 25:
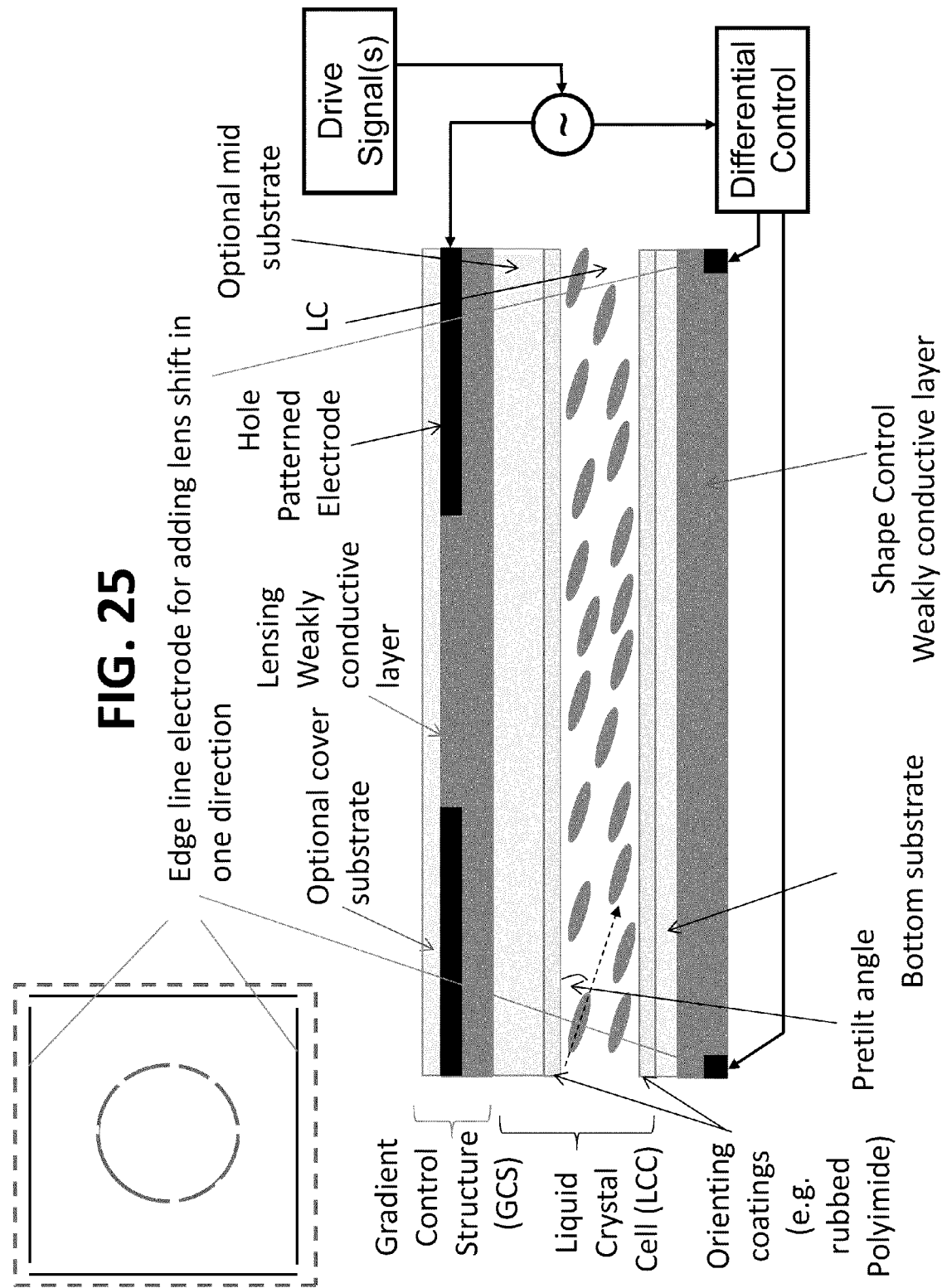
FIG. 25 is a schematic diagram showing a frequency controlled tunable liquid crystal lens using a second frequency dependent weakly conductive layer separately from lens formation, for example to provide pan, tilt, beam steering, image stabilization, optical error correction, etc.

In particular, with reference to FIG. 25, the frequency control described herein above with respect to the use a frequency dependent weakly conductive layer can be employed in a TLC lens structure separately from lens formation, for example to provide pan, tilt, beam steering, image stabilization, optical error correction, etc. In the embodiment illustrated in FIG. 25 the bottom conductive transparent ITO electrode is replaced, in accordance with the proposed solution, by a frequency dependent weakly conductive layer, and strip electrodes (shown), such as described herein above with reference to FIG. 19A; a segmented electrode (now shown), such as described herein above; or a shape control electrode structure configured to provide pan, tilt, beam steering, image stabilization, optical correction, etc. In operation, the top frequency dependent weakly conductive layer and the hole patterned electrode act on the electric field to create a (symmetric) lensing effect via the LC layer and in this sense the top weakly conductive layer is referred to as the "lensing weakly conductive layer". Separately, at the bottom frequency dependent weakly conductive layer and strip electrodes operate in accordance with a shape control drive signal. For example, if the strip electrodes are fed drive signal components having the same low frequency and same voltage amplitude, the large charge mobility causes the frequency dependent weakly conductive layer appear as a continuous electrode mimicking the flat conductive ITO electrode and therefore the overall lensing effect is substantially equivalent to that provided by TLC lens structures described in FIGS. 4A, 4B, 11A and 11B. However, by feeding opposed strip electrodes with different drive signal components, either different frequencies or different voltage amplitudes, the bottom frequency dependent weakly conductive layer, in electrical filed terms, appears as a ramp (wedge) inducing a corresponding wage shaped distortion to the overall electric field. In this sense, the bottom frequency dependent weakly conductive layer operates as a shape control weakly conductive layer providing shape control. Depending on the bottom electrode structure used and the combination of drive signal components fed thereto, the shape control weakly conductive layer provides electric field (optical element) shaping, for example providing pan, tilt, beam steering, image stabilization, optical correction, etc.

For greater certainty any number of electrodes, for example illustrated in FIGS. 4A, 4B, 11A, 11B, 19A, 19B, 20 and 25 can be employed in accordance with the proposed solution to implement the calibration functionality in order to characterize electrical parameters of a liquid crystal lens or optical device via corresponding equivalent electrical circuits, corresponding calibration currents, at different temperatures, etc.

As disclosed in WO2009/153764 published Dec. 23, 2009, which is incorporated herein by reference, the frequency dependent material can also comprise impurities or a dopant within the liquid crystal without having a sheet of resistive material at all or it can be in combination with the sheet of resistive material.

While the embodiment of FIGS. 2, 4A/4B illustrate a tunable lenses, the liquid crystal optical device can alternatively have a liquid crystal layer with materials having a large anisotropy of absorption (otherwise called "dichroic absorbing" materials) controllably oriented to act as a shutter or as a diaphragm device. Differences in absorption coefficient between two orientation states (with respect to the polarization of light) can be orders of magnitude when the material properties, typically the molecule length (namely the aspect ratio) as well as its ability to absorb light within the desired spectrum, are well suited. Carbon nano tubes, chains of dirchroic dyes, metal or semiconductor nano rods can offer the aspect ratio, absorption properties and stability to be suitable for such application.

A shutter can be spatially uniform and switched between only two states (transparent and absorbing), or continuously variable between its extreme states. In contrast, a diaphragm (or eclipse) is spatially non uniform and variable. An iris/diaphragm typically has a center aperture (or transparent zone) that can be increased and decreased in size. An "eclipse"/iris blocks light from a dot in the center than can be increased in size.

Certain materials (such as dichroic dyes) having a large anisotropy of absorption can be controllably oriented to act as a spatially variable diaphragm device using a liquid crystal material (as "host") to help orient the absorbing material without imparting any undesired optical effect, such as lensing.

While the invention has been shown and described with referenced to preferred embodiments thereof, it will be recognized by those skilled in the art that various changes in form and detail can be made therein without departing from the spirit and scope of the invention as defined by the appended claims.

What is claimed is:

1. A tunable liquid crystal optical device comprising:
    an electrode arrangement associated with a liquid crystal cell and including a hole patterned electrode, wherein control of said liquid crystal cell depends on electrical characteristics of liquid crystal optical device layers and on conductivity of a resistive material and wherein said electrode arrangement comprises a frequency dependent material layer near said hole patterned electrode, said frequency dependent material layer comprising a substantial part of said resistive material;
    a circuit for measuring said electrical characteristics of said liquid crystal optical device layers;
    a circuit for measuring an impedance of said resistive material;
    a drive signal circuit having at least one parameter adjusted as a function of said measured electrical characteristics and as a function of said impedance measured, said drive signal circuit generating a control signal for said electrode arrangement,
    wherein said frequency dependent material is electrically insulated from said hole patterned electrode, and said electrode arrangement comprises a capacitive coupling via said hole patterned electrode to said frequency dependent material layer.

2. The device as claimed in claim 1, further comprising a resistive heating circuit responsive to said measured impedance, wherein said resistive material has a resistance dependent on temperature, and said resistive heating circuit maintains said liquid crystal cell at a desired operating temperature.

3. The device as claimed in claim 2, wherein a uniform planar electrode of said electrode arrangement is used by said resistive heating circuit.

4. The device as claimed in claim 1, wherein said hole patterned electrode is one of a ring electrode and a segmented electrode.

5. The device as claimed in claim 1, comprising an upper liquid crystal layer and a lower liquid crystal layer adapted to act on different polarizations of light, said hole patterned electrode and said frequency dependent material layer being positioned between said upper and said lower liquid crystal layers.

6. The device as claimed in claim 1, wherein said drive signal circuit uses frequency to control said device, said parameter comprising a transfer function relating frequency to optical property of said device.

7. The device as claimed in claim 6, wherein said device is one of a tunable optical power lens, a tunable iris and a beam steering device.

8. A tunable liquid crystal optical device comprising:
an electrode arrangement associated with a liquid crystal cell and including a hole patterned electrode, wherein control of said liquid crystal cell depends on electrical characteristics of liquid crystal optical device layers and on conductivity of a resistive material and wherein said electrode arrangement comprises a frequency dependent material layer near said hole patterned electrode, said frequency dependent material layer comprising a substantial part of said resistive material;
a circuit for measuring said electrical characteristics of said liquid crystal optical device layers;
a circuit for measuring an impedance of said resistive material;
a drive signal circuit having at least one parameter adjusted as a function of said measured electrical characteristics and as a function of said impedance measured, said drive signal circuit generating a control signal for said electrode arrangement,
wherein said electrode arrangement comprises an outer electrode running parallel to said hole patterned electrode, both said hole patterned electrode and said outer electrode being capacitively coupled to said frequency dependent material layer.

9. The device as claimed in claim 8, wherein said circuit comprises a contact with said frequency dependent material layer.

10. The device as claimed in claim 8, wherein said hole patterned electrode is one of a ring electrode and a segmented electrode.

11. The device as claimed in claim 8, further comprising a resistive heating circuit responsive to said measured impedance, wherein said resistive material has a resistance dependent on temperature, and said resistive heating circuit maintains said liquid crystal cell at a desired operating temperature.

12. The device as claimed in claim 11, wherein a uniform planar electrode of said electrode arrangement is used by said resistive heating circuit.

13. The device as claimed in claim 8, comprising an upper liquid crystal layer and a lower liquid crystal layer adapted to act on different polarizations of light, said hole patterned electrode and said frequency dependent material layer being positioned between said upper and said lower liquid crystal layers.

14. The device as claimed in claim 8, wherein said drive signal circuit uses frequency to control said device, said parameter comprising a transfer function relating frequency to optical property of said device.

15. The device as claimed in claim 14, wherein said device is one of a tunable optical power lens, a tunable iris and a beam steering device.

16. A method of manufacturing a tunable liquid crystal optical device having an electrode arrangement associated with a liquid crystal cell and including a hole patterned electrode, wherein control of said liquid crystal cell depends on electrical characteristics of liquid crystal optical device layers and on conductivity of a resistive material, wherein said electrode arrangement comprises a frequency dependent material layer near a hole patterned electrode, said frequency dependent material layer comprising a substantial part of said resistive material, and a drive signal circuit having at least one parameter adjusted as a function of measured electrical characteristics and as a function of measured impedance, said drive signal circuit and for generating a control signal for said electrode arrangement, the method comprising:
measuring said electrical characteristics of said liquid crystal optical device layers;
measuring an impedance of said resistive material of said device; and
adjusting said parameter within said drive signal circuit,
wherein said frequency dependent material is electrically insulated from said hole patterned electrode, and said electrode arrangement comprises a capacitive coupling via said hole patterned electrode to said frequency dependent material layer.

17. The method as claimed in claim 16, wherein said circuit comprises a contact with said frequency dependent material layer.

18. The method as claimed in claim 16, comprising an upper liquid crystal layer and a lower liquid crystal layer adapted to act on different polarizations of light, said hole patterned electrode and said frequency dependent material layer being positioned between said upper and said lower liquid crystal layers.

19. The method as claimed in claim 16, wherein said hole patterned electrode is one of a ring electrode and a segmented electrode.

20. The method as claimed in claim 16, wherein said drive signal circuit uses frequency to control said device, said parameter comprising a transfer function relating frequency to optical property of said device.

21. The method as claimed in claim 20, wherein said device is one of a tunable optical power lens, a tunable iris and a beam steering device.

22. A method of manufacturing a tunable liquid crystal optical device having an electrode arrangement associated with a liquid crystal cell and including a hole patterned electrode, wherein control of said liquid crystal cell depends on electrical characteristics of liquid crystal optical device layers and on conductivity of a resistive material, wherein said electrode arrangement comprises a frequency dependent material layer near the hole patterned electrode, said frequency dependent material layer comprising a substantial part of said resistive material, and a drive signal circuit having at least one parameter adjusted as a function of measured electrical characteristics, the at least one parameter including a parameter adjustable corresponding to an impedance of said resistive material and for generating a control signal for said electrode arrangement, the method comprising:
measuring said electrical characteristics of said liquid crystal optical device layers;
measuring an impedance of said resistive material of said device; and
adjusting said at least one parameter within said drive signal circuit,
wherein said electrode arrangement comprises an outer electrode running parallel to said hole patterned electrode, both said hole patterned electrode and said outer electrode being capacitively coupled to said frequency dependent material layer.

23. The method as claimed in claim 22, wherein said hole patterned electrode is one of a ring electrode and a segmented electrode.

24. The method as claimed in claim 22, wherein said drive signal circuit uses frequency to control said device, said at least one parameter comprising a transfer function relating frequency to an optical property of said device.

25. The method as claimed in claim 24, wherein said device is one of a tunable optical power lens, a tunable iris and a beam steering device.

26. The method as claimed in claim 22, wherein said hole patterned electrode is one of a ring electrode and a segmented electrode.

27. The method as claimed in claim 22, wherein said circuit comprises a contact with said frequency dependent material layer.

28. The method as claimed in claim 22, comprising an upper liquid crystal layer and a lower liquid crystal layer adapted to act on different polarizations of light, said hole patterned electrode and said frequency dependent material layer being positioned between said upper and said lower liquid crystal layers.

* * * * *